US012359475B2

(12) United States Patent
Okawa

(10) Patent No.: US 12,359,475 B2
(45) Date of Patent: Jul. 15, 2025

(54) VEHICLE DOOR LATCH DEVICE

(71) Applicant: MITSUI KINZOKU ACT CORPORATION, Yokohama (JP)

(72) Inventor: Shintaro Okawa, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 140 days.

(21) Appl. No.: 18/112,679

(22) Filed: Feb. 22, 2023

(65) Prior Publication Data

US 2023/0279702 A1 Sep. 7, 2023

(30) Foreign Application Priority Data

Mar. 3, 2022 (JP) ................................ 2022-032274

(51) Int. Cl.

*E05B 81/14* (2014.01)
*E05B 81/06* (2014.01)
*E05B 85/02* (2014.01)
*E05B 85/24* (2014.01)
*E05B 85/26* (2014.01)
*E05B 81/30* (2014.01)

(52) U.S. Cl.

CPC .............. *E05B 81/14* (2013.01); *E05B 81/06* (2013.01); *E05B 85/02* (2013.01); *E05B 85/243* (2013.01); *E05B 85/26* (2013.01); *E05B 81/30* (2013.01)

(58) Field of Classification Search

CPC .......... E05B 81/00; E05B 81/04; E05B 81/06; E05B 81/14; E05B 81/30; E05B 85/02; E05B 85/243; E05B 85/26

See application file for complete search history.

(56) References Cited

U.S. PATENT DOCUMENTS 8,267,444 B2 * 9/2012 Akizuki .................. E05B 81/16 292/216
8,870,247 B2 * 10/2014 Yamagata ............... E05B 85/02 292/216
9,249,605 B2 * 2/2016 Yamagata ............... E05B 85/02
(Continued)

FOREIGN PATENT DOCUMENTS

JP 2021-75942 5/2021
WO WO-2021019797 A1 * 2/2021 ............. E05B 77/34

*Primary Examiner* — Kristina R Fulton
*Assistant Examiner* — Noah Horowitz
(74) *Attorney, Agent, or Firm* — NIXON & VANDERHYE

(57) ABSTRACT

A vehicle door latch device has actuator and engagement assemblies of a front- or rear-tooth engagement system. The engagement assembly includes a body, a pivotable latch engaging a striker, a pivotable ratchet engaging the latch, and an input lever pivotably supported to the body to transmit its releasing operation to the ratchet. The actuator assembly includes a housing fixed to the body and an output lever transmitting power to the input lever. The housing includes a body covering portion selectively fixed to the engagement assembly of the front-tooth engagement system and that of the rear-tooth engagement system. The output lever is pivotably supported in the housing with an output portion moving vertically based on its releasing operation. The input lever has an input portion that crosses the output portion, and is released by abutting the output portion with the input portion based on the output lever releasing operation.

8 Claims, 24 Drawing Sheets

(56) References Cited

U.S. PATENT DOCUMENTS

| | | | | |
|---|---|---|---|---|
| 9,476,230 | B2 | 10/2016 | Margheritti | |
| 10,125,524 | B2 * | 11/2018 | Kouzuma | E05B 81/14 |
| 10,132,107 | B2 * | 11/2018 | Tomaszewski | E05B 85/243 |
| 11,377,883 | B2 * | 7/2022 | Taurasi | E05B 81/16 |
| 11,591,832 | B2 * | 2/2023 | Kajigai | E05B 85/243 |
| 11,965,367 | B2 * | 4/2024 | Okawa | E05B 77/34 |
| 12,129,689 | B2 * | 10/2024 | Okawa | E05B 81/54 |
| 2021/0032911 | A1 * | 2/2021 | Ishiguro | E05B 81/42 |

* cited by examiner

VEHICLE DOOR LATCH DEVICE

This application claims priority to JP Patent Application No. 2022-032274 filed Mar. 3, 2022, the entire contents of which is hereby incorporated by reference.

FIELD OF THE INVENTION

The present invention relates to a vehicle door latch device mounted in a vehicle door.

BACKGROUND OF THE INVENTION

Generally, a vehicle door latch device using an electric releasing system that carries out a releasing operation of a door by a motive power of a motor, includes an engagement assembly and an actuator assembly, wherein the engagement assembly has a latch capable of engaging with a striker on a vehicle body when the door is closed, an engagement mechanism including a ratchet that engages with the latch to prevent the latch from pivoting in an opening direction and to hold the door in a closed position, and a body housing the engagement mechanism, and wherein the actuator assembly has a housing fixed to the body and an actuator mechanism part that is provided in the housing with including a motor. When the door is electrically released, an output portion of the actuator mechanism part is operated by a motive power of the motor of the actuator mechanism part. When the output portion operates, it abuts with an input portion of the engagement assembly to operate the ratchet and release the door.

Moreover, regarding an engagement system of the engagement mechanism of the engagement assembly of the vehicle door latch device, there are a front-tooth engagement system and a rear-tooth engagement system. Each automobile manufacturer uses the front-tooth engagement system or the rear-tooth engagement system according to each fixing position of the door latch device to the door.

As disclosed in JP 2021-075942 A, the front-tooth engagement system has a configuration that in a fully-latched position (a position shown in FIG. 3(b) of JP 2021-075942 A, the same below) of a latch (a latch member 10), a ratchet (a ratchet 20) engages with a fully-latched engagement portion (a hooking portion 12) that is provided in an opening direction side (a clockwise direction in FIG. 3(b)) of a striker engagement groove (no reference sign) of the latch.

As disclosed in U.S. Pat. No. 9,476,230 B2, the rear-tooth engagement system has a configuration that in a fully-latched position (a position shown in FIGS. 2, 5 of U.S. Pat. No. 9,476,230 B2, the same below) of a latch (a ratchet 15), a ratchet (a primary pawl 25) engages with a fully-latched engagement portion (a shoulder 22) that is provided in a closing direction side (a counterclockwise direction) of a striker engagement groove (a seat 18) of the latch.

SUMMARY OF THE INVENTION

However, when comparing the front-tooth engagement system and the rear-tooth engagement system, a pivoting center of the ratchet of the front-tooth engagement system is positioned in a side (in a striker entering side) fronter than that of the ratchet of the rear-tooth engagement system. Thus, a pivoting center of an input lever releasing the ratchet of the front-tooth engagement system is compelled to be arranged in the side fronter than that of the rear-tooth engagement system. Therefore, there is a difference in the position of the output portion that transmits the motive power of the motor to the input lever in the actuator assembly side between the front-tooth engagement system and the rear-tooth engagement system. As a result, it is difficult to communize the entire actuator assembly including the actuator mechanism part between the front-tooth engagement system and the rear-tooth engagement system.

In view of the above disadvantages, an object of the present invention is to provide a vehicle door latch device that makes it possible to communize an actuator mechanism part by changing a housing only of an actuator assembly according to each engagement system, even though the engagement assembly uses the engagement systems in which each pivoting center of a ratchet is different in position, such as a front-tooth engagement system and a rear-tooth engagement system.

According to the present invention, the above problems are solved as follows. Namely, the vehicle door latch device of the present invention has an engagement assembly and an actuator assembly, wherein the engagement assembly includes
- a body,
- a latch that is supported to the body to pivot by a latch shaft oriented in a left-right direction and is formed with a striker engagement groove engaging with a striker entering from frontward,
- a ratchet that is supported to the body to pivot by a ratchet shaft oriented in the left-right direction and to engage with a front-tooth-side fully-latched engagement portion provided on an opening direction side of the striker engagement groove of the latch or a rear-tooth-side fully-latched engagement portion provided on a closing direction side of the striker engagement groove of the latch, and
- an input lever that is supported to the body to pivot and to transmit its releasing operation to the ratchet, wherein the actuator assembly includes
- a housing fixed to the body, and
- an actuator mechanism part arranged in the housing to include a motor and an output lever transmitting a motive power of the motor to the input lever, wherein the housing includes
- a body covering portion that covers the body and is selectively fixed to the engagement assembly of a front-tooth engagement system in which the ratchet engages with the front-tooth-side fully-latched engagement portion of the latch and the engagement assembly of a rear-tooth engagement system in which the ratchet engages with the rear-tooth-side fully-latched engagement portion of the latch, and
- an actuator housing part substantially perpendicular to a back surface of the body to have an arrangement surface which faces a front direction and on which the actuator mechanism part is arranged, wherein the output lever is supported to the actuator housing part to pivot by a first shaft oriented in a front-back direction and is formed with an output portion that moves vertically based on its releasing operation, and wherein the input lever is supported to the back surface of the body to pivot by a second shaft oriented in the left-right direction, is formed with an input portion at an end portion extending to cross the output portion of the output lever, and is released by abutting the output portion with the input portion based on the releasing operation of the output lever.

According to the present invention, because an input portion of an engagement assembly and an output portion of an actuator assembly are arranged so as to cross each other, by changing a housing only of engagement assemblies that use different engagement systems respectively, it is possible to communize an actuator mechanism part provided in the housing and to decrease cost.

EMBODIMENTS OF THE INVENTION

The present invention is explained in detail by referring to the present embodiments according to the drawings.

The vehicle door latch device of each of the present embodiments enables a common use of an actuator mechanism part in an actuator assembly, regardless of whether an engagement assembly uses a front-tooth engagement system or a rear-tooth engagement system, on the premise that the vehicle door latch device has a configuration to have the engagement assembly that includes an engagement mechanism holding a door in a closed state by engaging with a striker on a vehicle body, and the actuator assembly in which the actuator mechanism part including a motor is arranged in a housing assembled to the engagement assembly.

To definitize the difference between the configuration of the front-tooth engagement system and that of the rear-tooth engagement system, at first, a vehicle door latch device 1 using a rear-tooth engagement system according to one embodiment is explained based on FIGS. 1 to 17, and next, another vehicle door latch device 100 using a front-tooth engagement system according to another embodiment is explained based on FIGS. 18 to 26.

Incidentally, in the following description, a direction criterion of the front, rear, right, and left of each of the vehicle door latch devices 1, 100 is on the basis of the device alone. Thus, when the direction criterion is exchanged with that on the basis of a vehicle in a state of respectively fixing the vehicle door latch devices 1, 100 to the door, the front direction corresponds to a direction toward a vehicle interior side, the rear direction corresponds to a direction toward a vehicle exterior side, the right direction corresponds to a direction toward a vehicle rear side, and the left direction corresponds to a direction toward a vehicle front side.

(Vehicle Door Latch Device 1 Using Rear-Tooth Engagement System)

Figure 1:
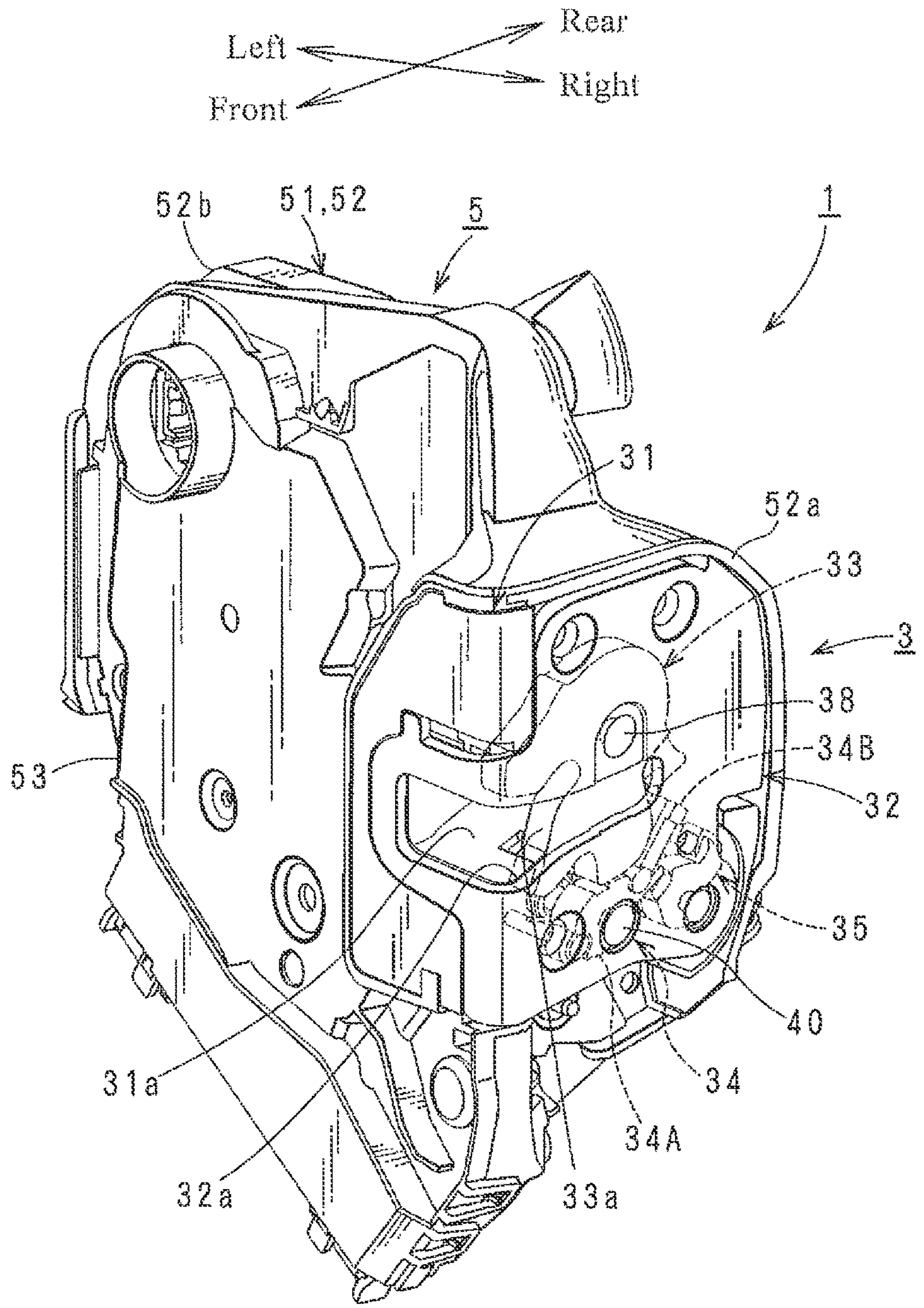
FIG. 1 is a perspective view showing a vehicle door latch device of one embodiment of the present invention.
Figure 2:
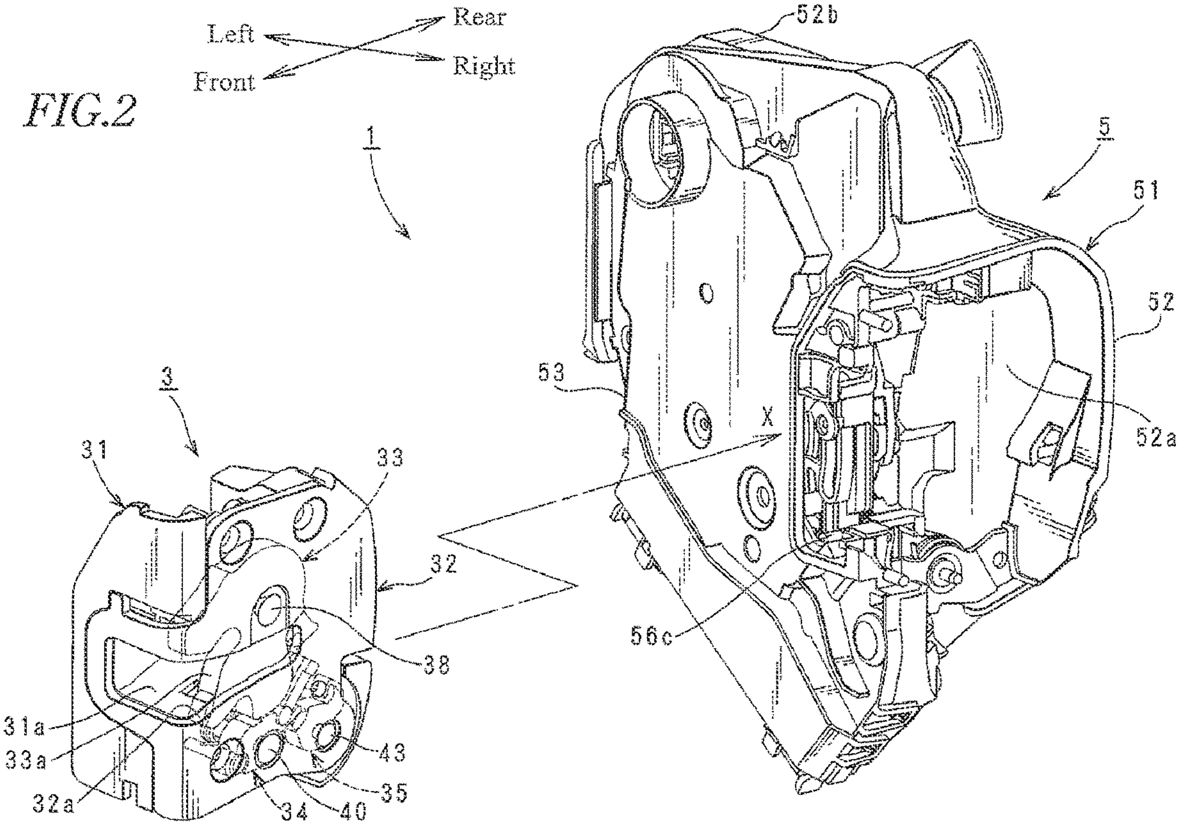
FIG. 2 is an exploded perspective view showing the vehicle door latch device.

As shown in FIGS. 1, 2, the vehicle door latch device 1 includes an engagement assembly 3 using the rear-tooth engagement system and an actuator assembly 5 assembled to the engagement assembly 3.

Figure 3:
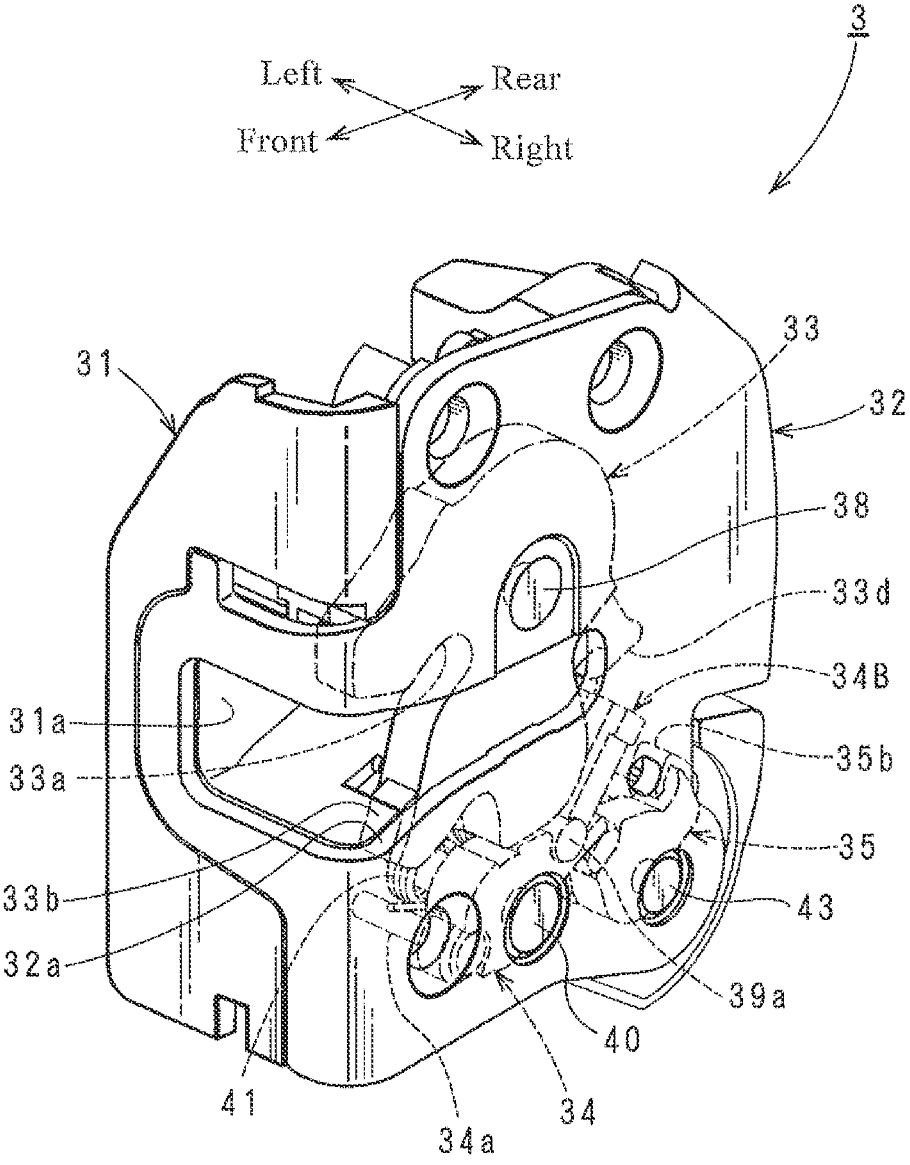
FIG. 3 is a perspective view showing an engagement assembly.
Figure 4:
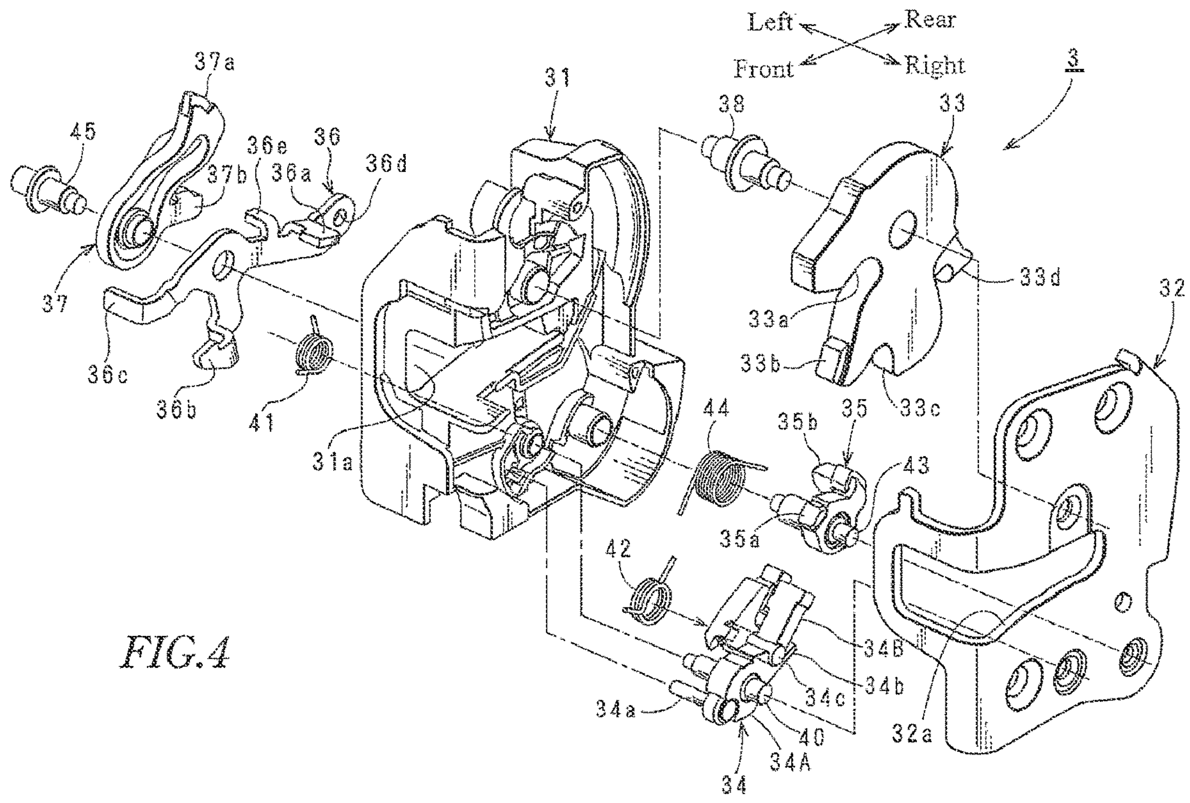
FIG. 4 is an exploded perspective view showing the engagement assembly.
Figure 5:
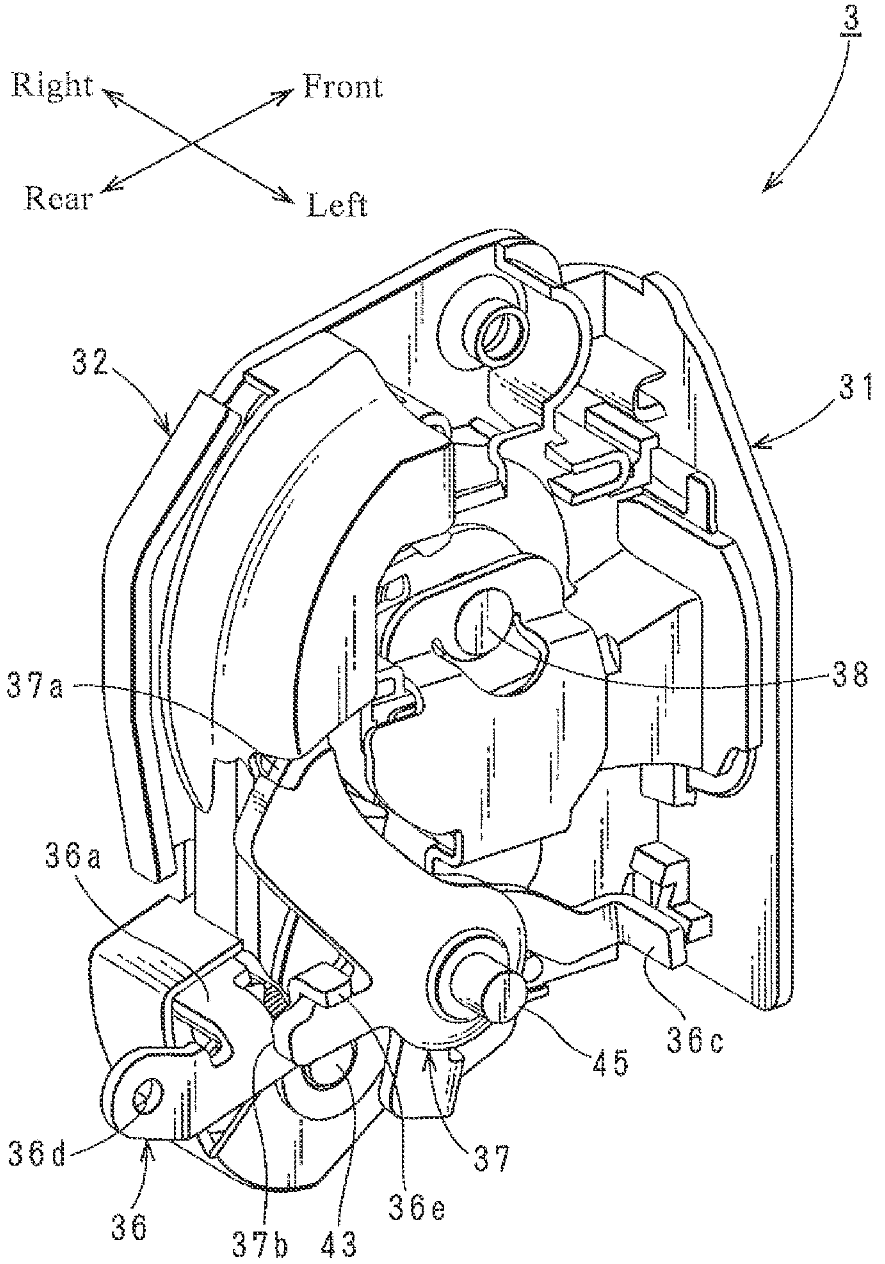
FIG. 5 is a perspective view showing the engagement assembly viewed from a back surface side.
Figure 6:
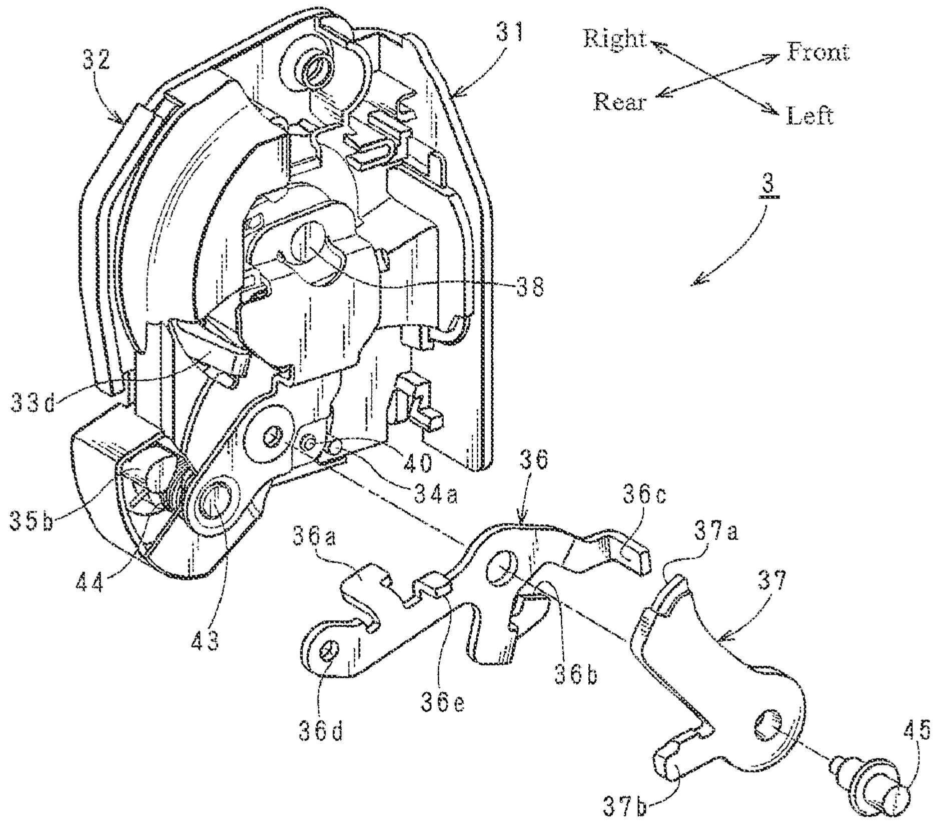
FIG. 6 is an exploded perspective view showing the engagement assembly viewed from the back surface side.

Moreover, as also shown in FIGS. 3, 4, the engagement assembly 3 includes

- a main body 31 made of a synthetic resin and a cover plate 32 made of metal to close a surface (a right-side surface) of the main body 31, wherein these are fixed to an internal surface of the door with a plurality of bolts not shown,
- a latch 33, a ratchet 34, and a holding lever 35 that are engagement members arranged between the main body 31 and the cover plate 32, and
- a input lever 36 and a stopper lever 37 that are arranged on a back surface (a left-side surface) of the main body 31.

A striker entrance groove 31*a* into which a striker S on the vehicle body is possible to enter from frontward when the door is closed is provided on the main body 31 in its approximately middle portion in a vertical direction. A striker entrance notch 32*a* into which the striker S is possible to enter from frontward when the door is closed is provided on the cover plate 32 to be overlapped on a right side of the striker entrance groove 31*a* of the main body 31.

Figure 7:
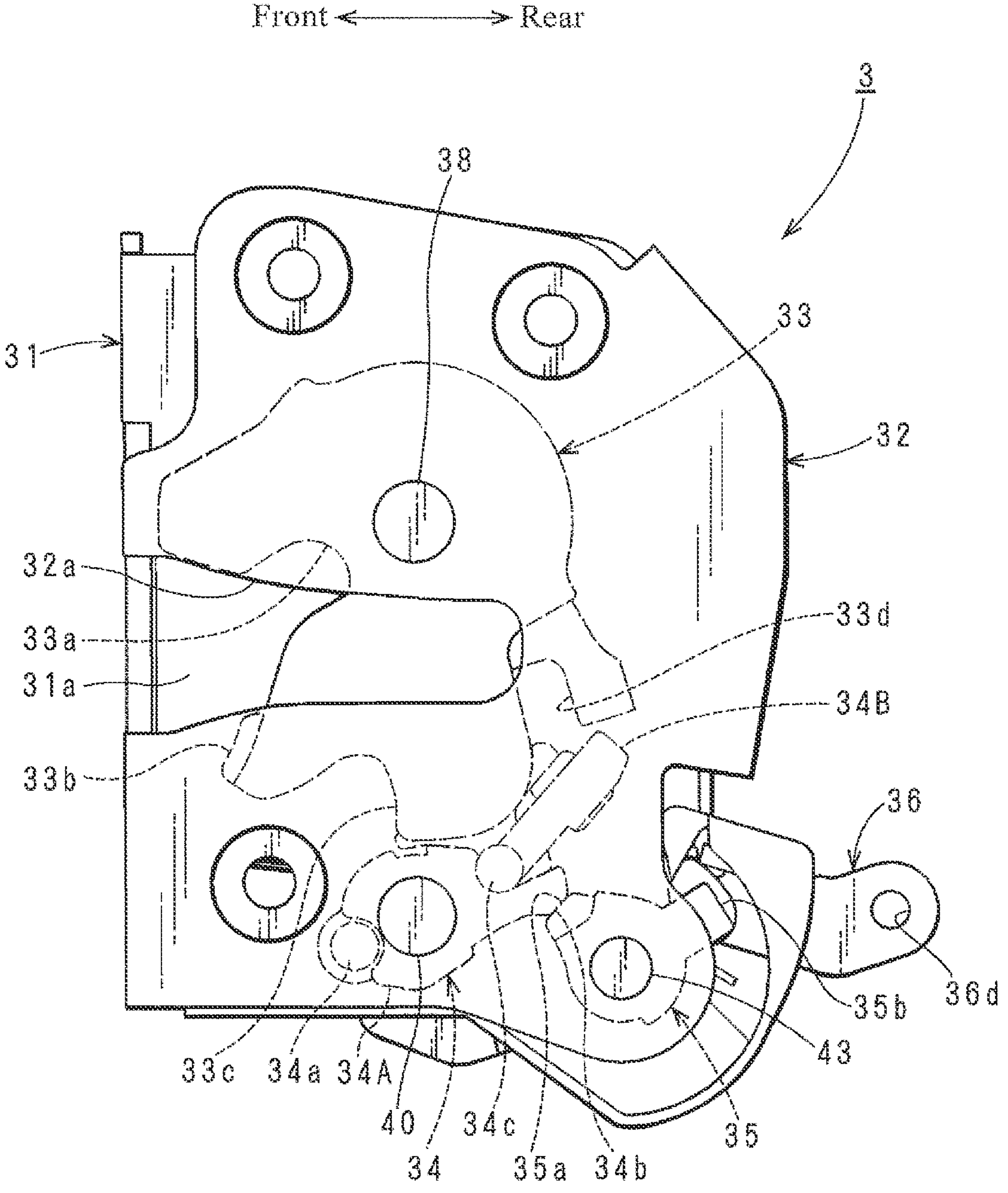
FIG. 7 is a front elevational view showing the engagement assembly viewed from a right side.
Figure 9:
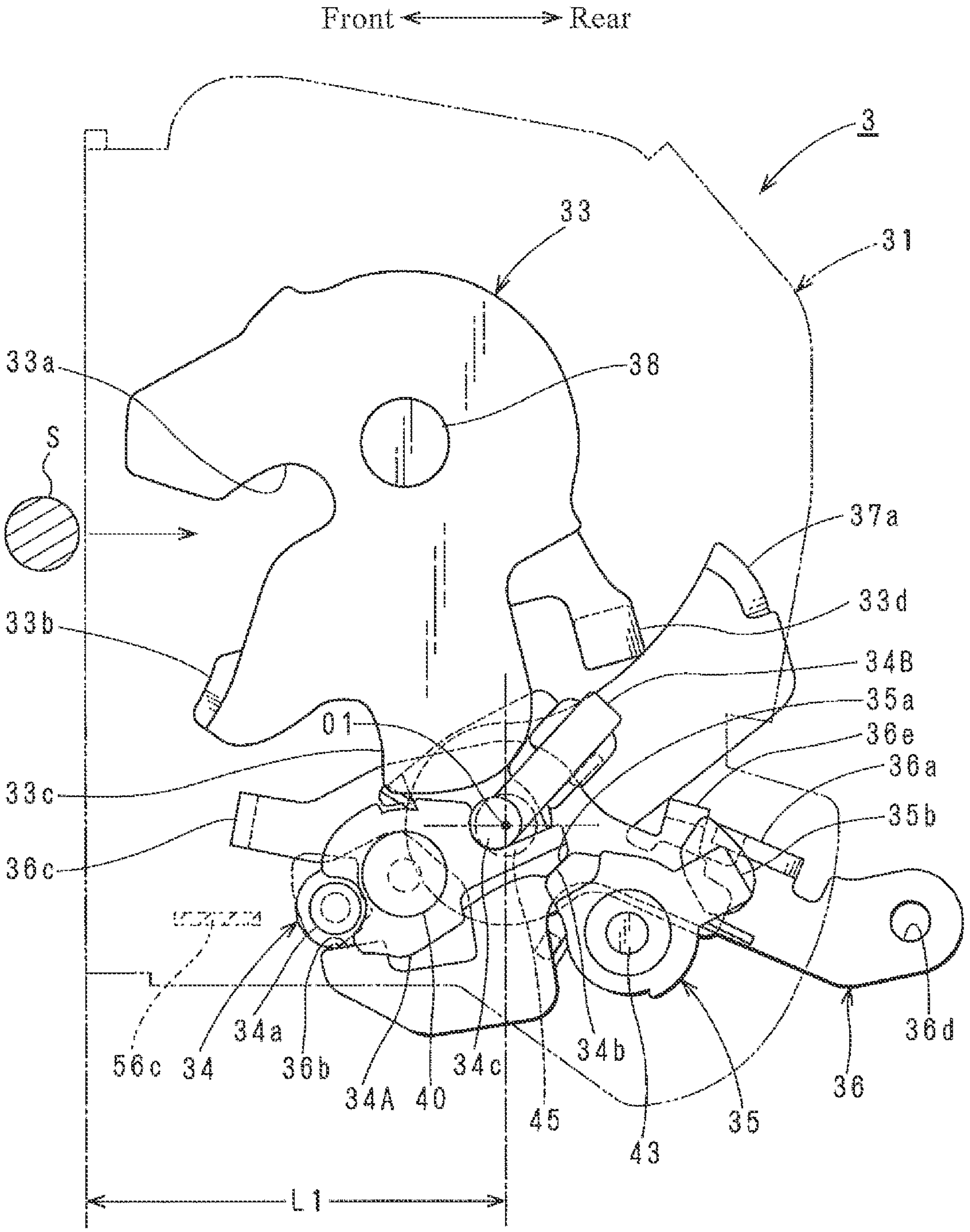
FIG. 9 is a front elevational view showing a principal part in an open state.
Figure 10:
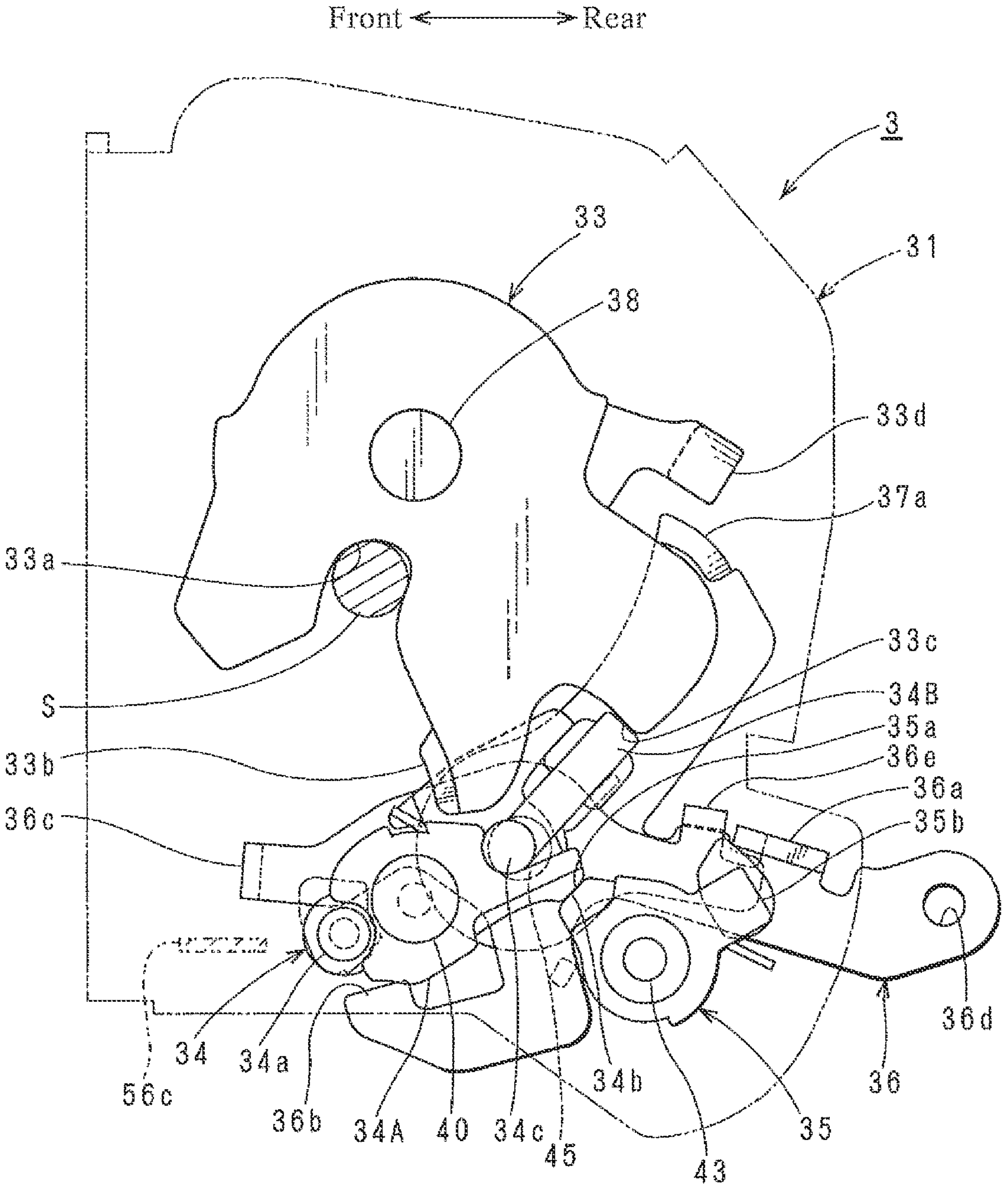
FIG. 10 is a front elevational view showing the principal part in a half-latched state.
Figure 11:
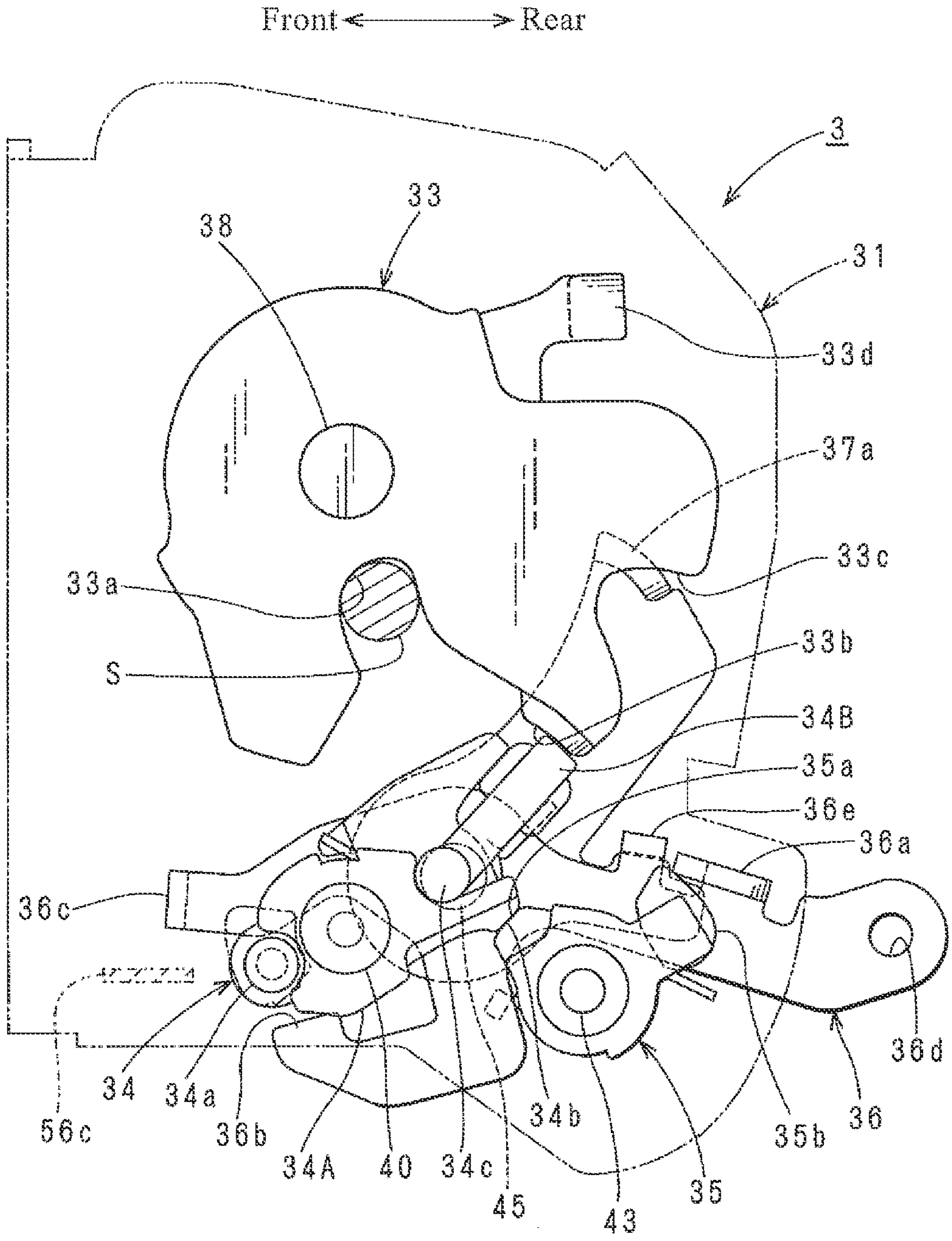
FIG. 11 is a front elevational view showing the principal part in a fully-latched state.

The latch 33 is supported pivotably at a predetermined angle by a latch shaft 38 oriented to a left-right direction between the main body 31 and the cover plate 32, is biased in an opening direction (a clockwise direction in FIG. 7) by a spring not shown, is made to pivot, against a biasing force of the spring, in a closing direction (a counterclockwise direction in FIGS. 7, 9) from an open position that is shown in FIGS. 7, 9 and corresponds to an open position of the door by entering of the striker S into the striker entrance groove 31*a* of the main body 31 and the striker entrance notch 32*a* of the cover plate 32 from forward according to a closing operation of the door, is made to pivot to a fully-latched position corresponding to a fully-closed position of the door shown in FIG. 11 via a half-latched position corresponding to an ajar position of the door shown in FIG. 10, and is made to pivot inversely according to an opening operation of the door.

The latch 33 is provided with a striker engagement groove 33*a* with which the striker S is capable of engaging when the door is closed, a fully-latched engagement portion 33*b* that is provided on the closing direction side (the counterclockwise direction side in FIGS. 7, 9) of the striker engagement groove 33*a* and is capable of engaging with a second ratchet 34B described later of the ratchet 34 when the latch 33 is in the fully-latched position shown in FIG. 11, a half-latched engagement portion 33*c* that is provided on the closing direction side of the fully-latched engagement portion 33*b* and is capable of engaging with the second ratchet 34B when the latch 33 is in the half-latched position shown in FIG. 10, and a third latch engagement portion 33*d* that is provided further in the closing direction side than the half-latched engagement portion 33*c* and is capable of abutting with a stopper portion 37*a* provided on an end portion of the stopper lever 37 when the latch 33 is in a third latch position (a position between the open position and the half-latched position) shown FIG. 12.

As shown in FIG. 4, the ratchet 34 includes a first ratchet 34A supported pivotably at a predetermined angle by a ratchet shaft 40 oriented in the left-right direction between the main body 31 and the cover plate 32, and the second ratchet 34B supported pivotably at a predetermined angle at a tip portion of the first ratchet 34A by a shaft portion 34*c* oriented in the left-right direction.

The first ratchet 34A is biased in an engaging direction (the counterclockwise direction in FIG. 7) by a biasing force of a spring 41, and is capable of pivoting in a releasing direction (the clockwise direction in FIGS. 10, 11) from an engagement position shown in FIGS. 10, 11 against the biasing force of the spring 41. The first ratchet 34A is provided with a cylindrical abutted portion 34*a* projecting in the left direction. Incidentally, since the engagement assembly 3 uses the rear-tooth engagement system, the ratchet shaft 40 supporting the first ratchet 34A to be pivotable is arranged on a lower portion of a back side (a rear side) of the striker entrance groove 31*a* and the striker entrance notch 32*a* as understandable from FIG. 7.

The second ratchet 34B is biased in an engaging direction (the counterclockwise direction in FIGS. 10, 11) in which its tip portion engages with the fully-latched engagement portion 33*b* or the half-latched engagement portion 33*c* of the latch 33, by a biasing force of a spring 42 of which one end portion is engaged with the second ratchet 34B and the other end portion is engaged with the first ratchet 34A.

Accordingly, as shown in FIG. 11, the ratchet 34 holds the latch 33 in the fully-latched position by engaging the second ratchet 34B with the fully-latched engagement portion 33*b* of the latch 33 while the first ratchet 34A is in the engagement position, and as shown in FIG. 10, the ratchet 34 holds the latch 33 in the half-latched position by engaging the second ratchet 34B with the half-latched engagement portion 33*c* of the latch 33 while the first ratchet 34A is in the engagement position. Moreover, when the first ratchet 34A pivots at a predetermined angle in the releasing direction (the clockwise direction in FIGS. 10, 11), the second ratchet 34B disengages from the fully-latched engagement portion 33*b* or the half-latched engagement portion 33*c* of the latch 33 to allow the latch 33 to pivot in the opening direction and to open the door.

The holding lever 35 is arranged in a rear side of the ratchet 34, is supported between the main body 31 and the cover plate 32 to be pivotable at a predetermined angle by a shaft 43 oriented to the left-right direction, and is biased in a holding direction (the counterclockwise direction in FIG. 7) by a spring 44 of which one end portion is engaged with the main body 31 and the other end portion is engaged with the holding lever 35. As shown in FIGS. 7, 9, 10, 11, etc., a holding portion 35*a* formed on an end portion of the holding lever 35 abuts with a held portion 34*b* formed on a lower portion of the first ratchet 34A from below to prevent the first ratchet 34A from pivoting in the releasing direction from the engagement position, and the holding lever 35 pivots at a predetermined angle in the releasing direction (the clockwise direction in FIGS. 7, 9, 10, 11) against a biasing force of the spring 44 so that the holding portion 35*a* disengages from the held portion 34*b* of the first ratchet 34A to allow the first ratchet 34A to pivot in the releasing direction.

Figure 8:
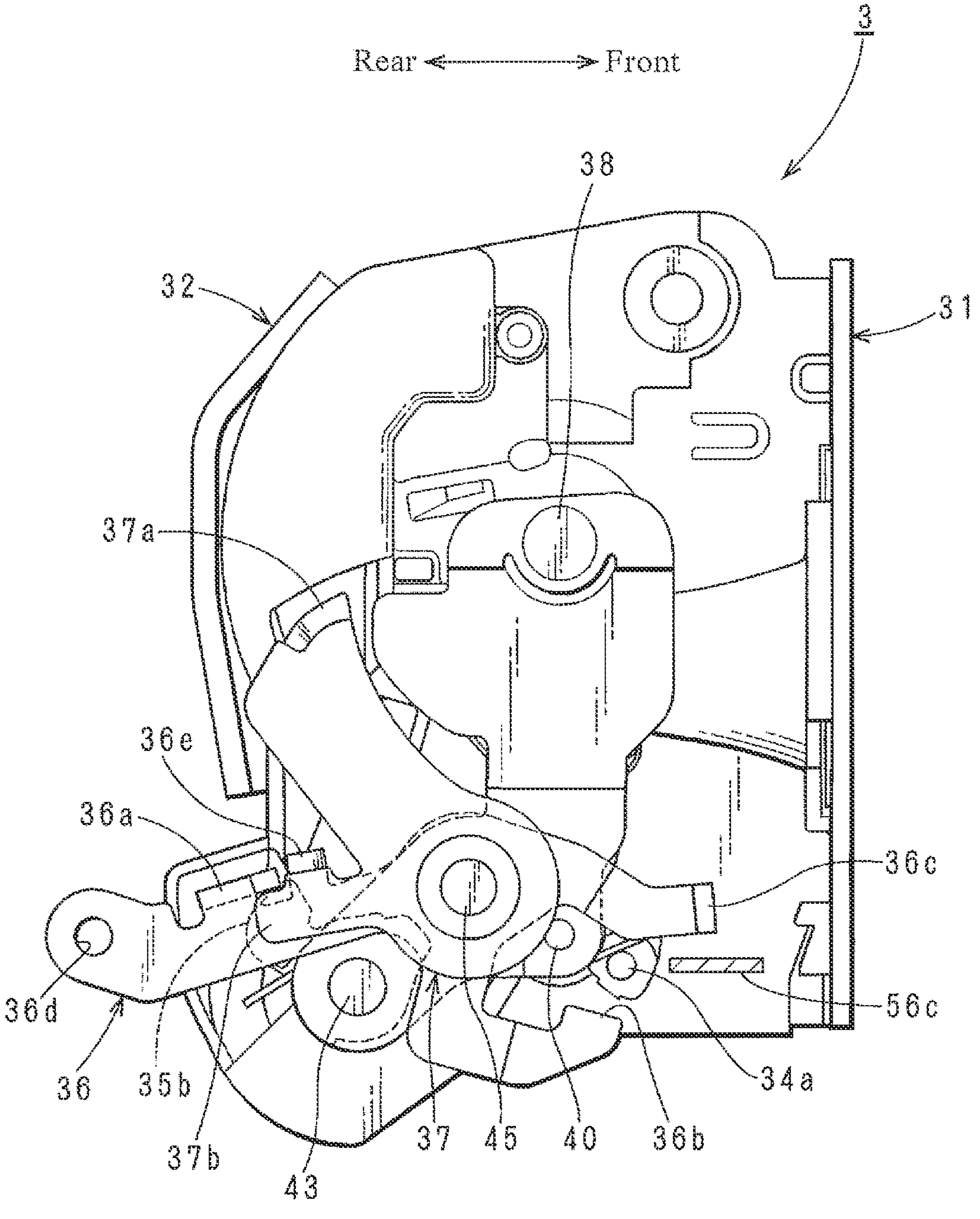
FIG. 8 is a rear elevational view showing the engagement assembly viewed from a left side.
Figure 13:
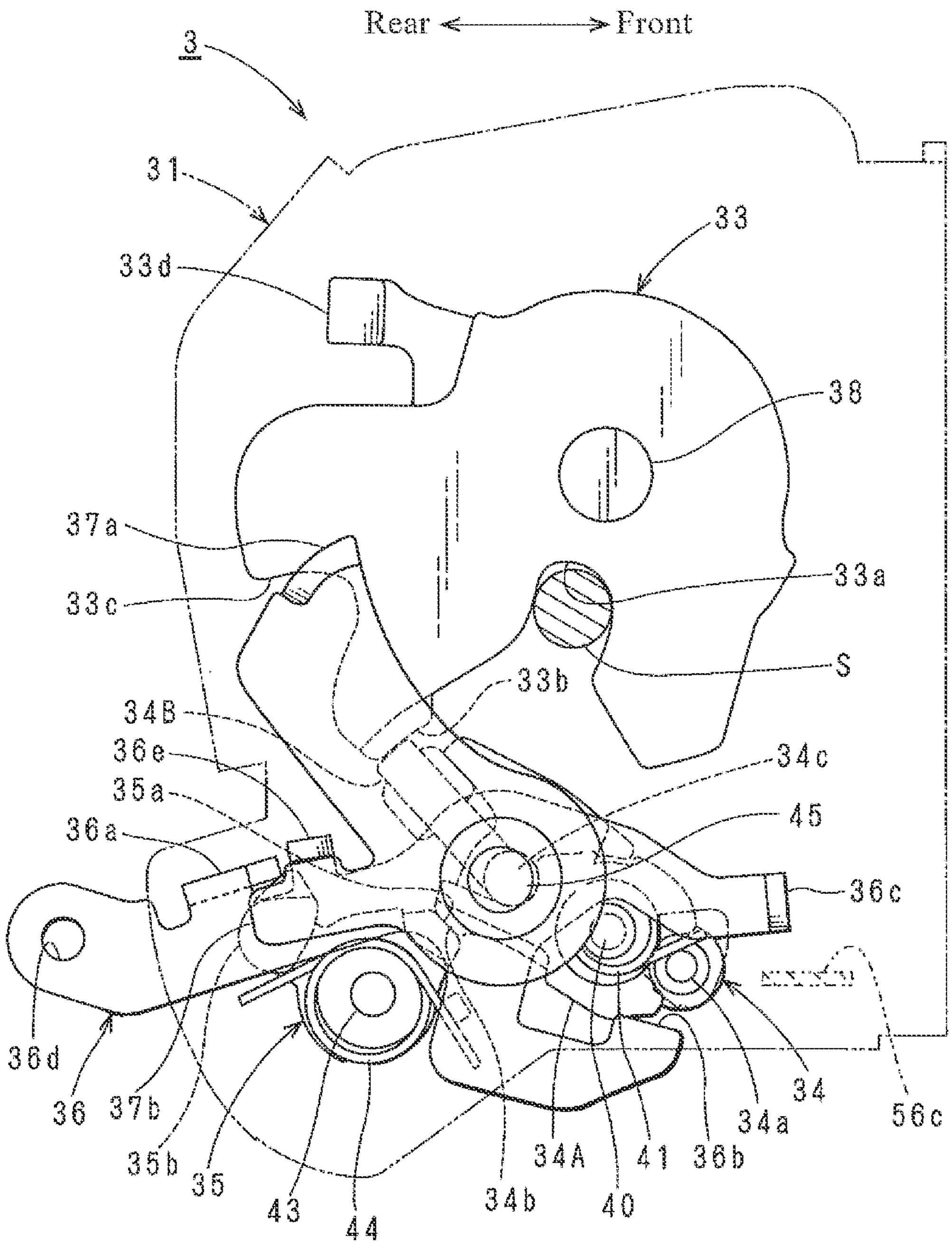
FIG. 13 is a rear elevational view showing the principal part in the fully-latched state.

The input lever 36 and the stopper lever 37 are respectively supported to the back surface (the left surface) of the main body 31 by a shaft 45 oriented in the left-right direction to be pivotable at a predetermined angle, and are respectively capable of pivoting at the predetermined angle in the releasing direction (the counterclockwise direction in FIGS. 8, 13) from each standby position shown in FIGS. 8, 13, and so on.

The input lever 36 is provided with a first abutting portion 36*a* that abuts with an abutted portion 35*b* formed on the holding lever 35 from above to make the holding lever 35 pivot in the releasing direction when the input lever 36 pivots in the releasing direction from the standby position, a second abutting portion 36*b* that abuts with the abutted portion 34*a* of the first ratchet 34A from below to operate the first ratchet 34A in the releasing direction, a first input portion 36*c* into which a motive power of a motor 54 described later of the actuator assembly 5 can be inputted, a second input portion 36*d* into which a manual operation force can be inputted, and a third abutting portion 36*e* capable of transmitting a releasing operation of the input lever 36 to the stopper lever 37. Thus, the input lever 36 pivots in the releasing direction from the standby position based on the motive power of the motor 54 or a manual operation.

The first input portion 36*c* is formed on a front-end portion of a frontward extending arm of the input lever 36 so as to be bent toward the left direction (the direction toward an output portion 56*c* of an output lever 56 described later), and is provided at a position deviated upward from the output portion 56*c* of the output lever 56 described later of the actuator assembly 5 such that the output portion 56*c* is possible to abut with the first input portion 36*c* from below when the output lever 56 is released. Thus, when the output lever 56 is released by the motive power of the motor 54 to make the output portion 56*c* abut with the first input portion 36*c* from below, the input lever 36 is made to pivot in the releasing direction from the standby position.

The second input portion 36*d* is coupled with a manual operation handle that is not shown and is provided in an exterior of the door. Thus, the input lever 36 pivots in the releasing direction from the standby position based on an operation of the manual operation handle. Incidentally, the manual operation handle is an emergency releasing means operated when an electrical system failure occurs to make the motor 54 of the actuator assembly 5 impossible to drive.

Figure 14:
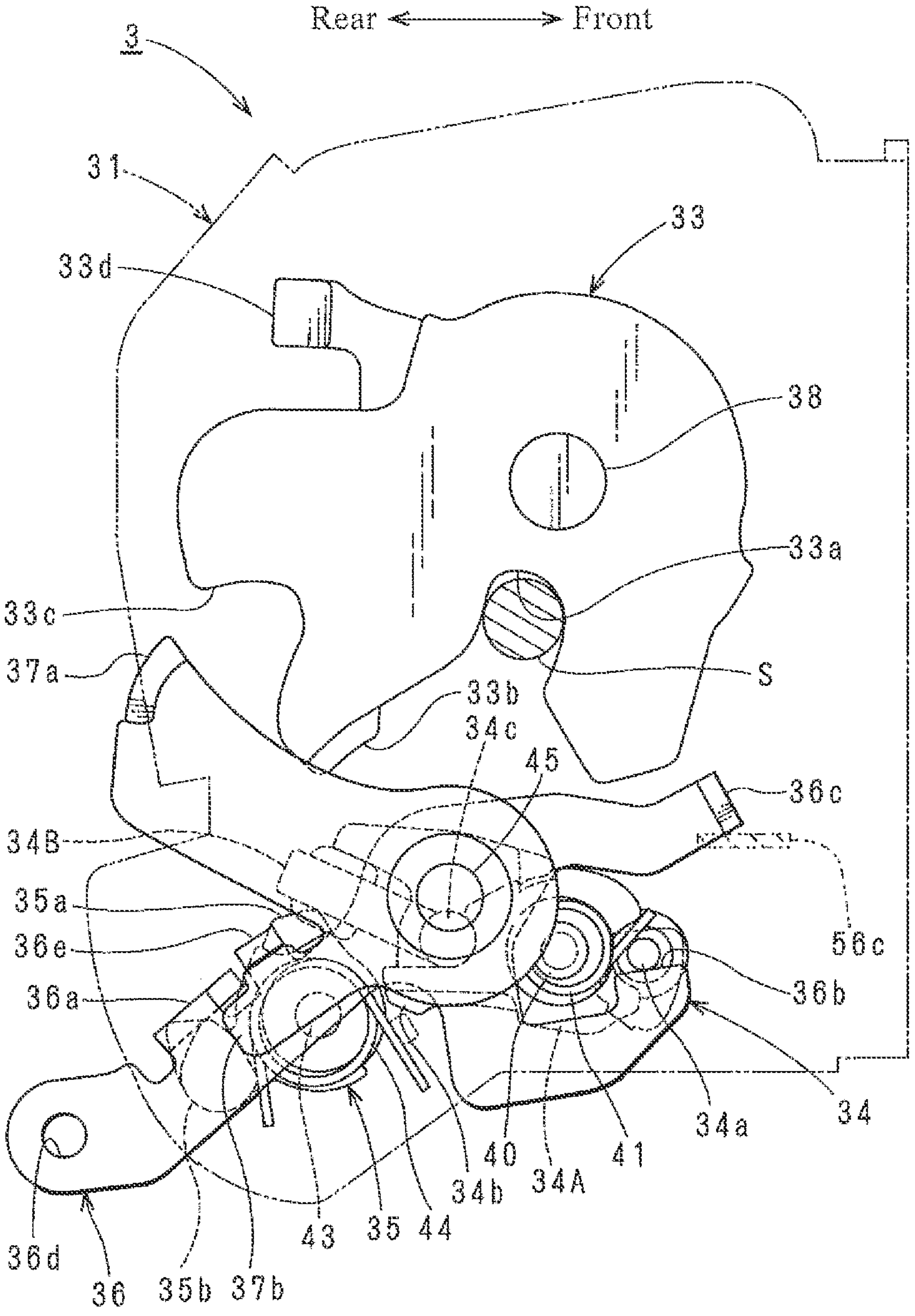
FIG. 14 is a rear elevational view showing the principal part in a releasing operation state.
Figure 15:
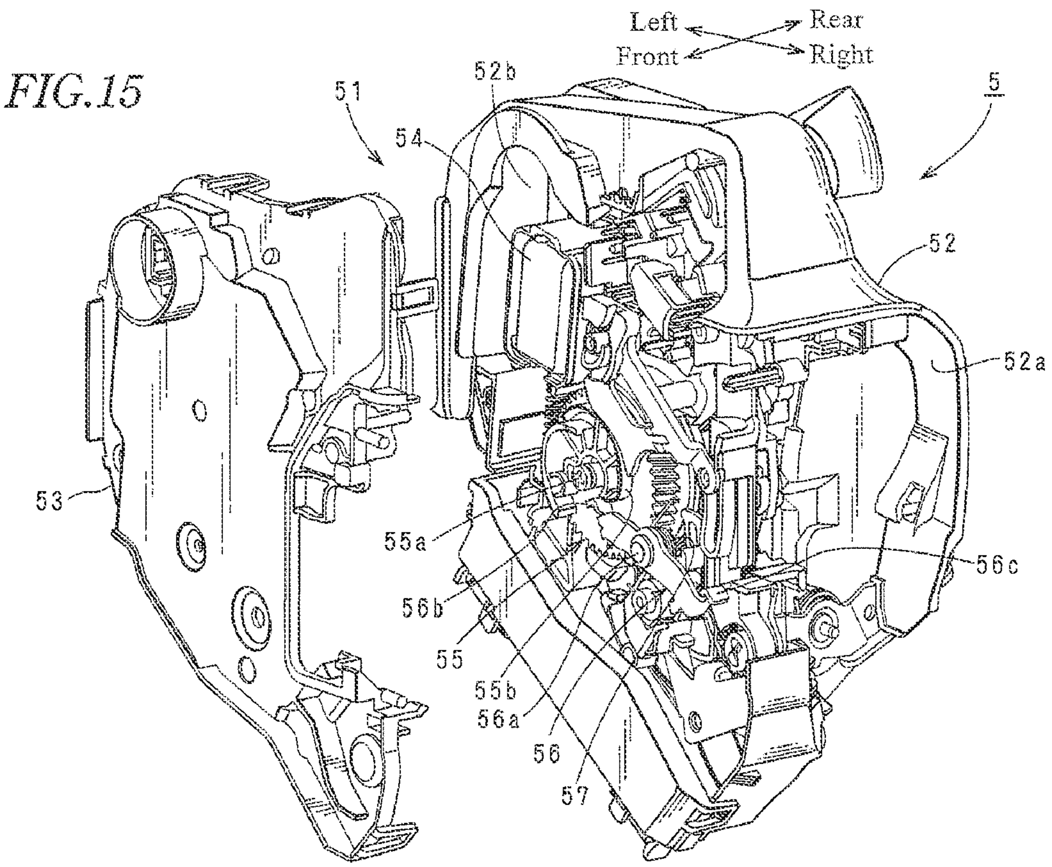
FIG. 15 is an exploded perspective view showing an actuator assembly.
Figure 16:
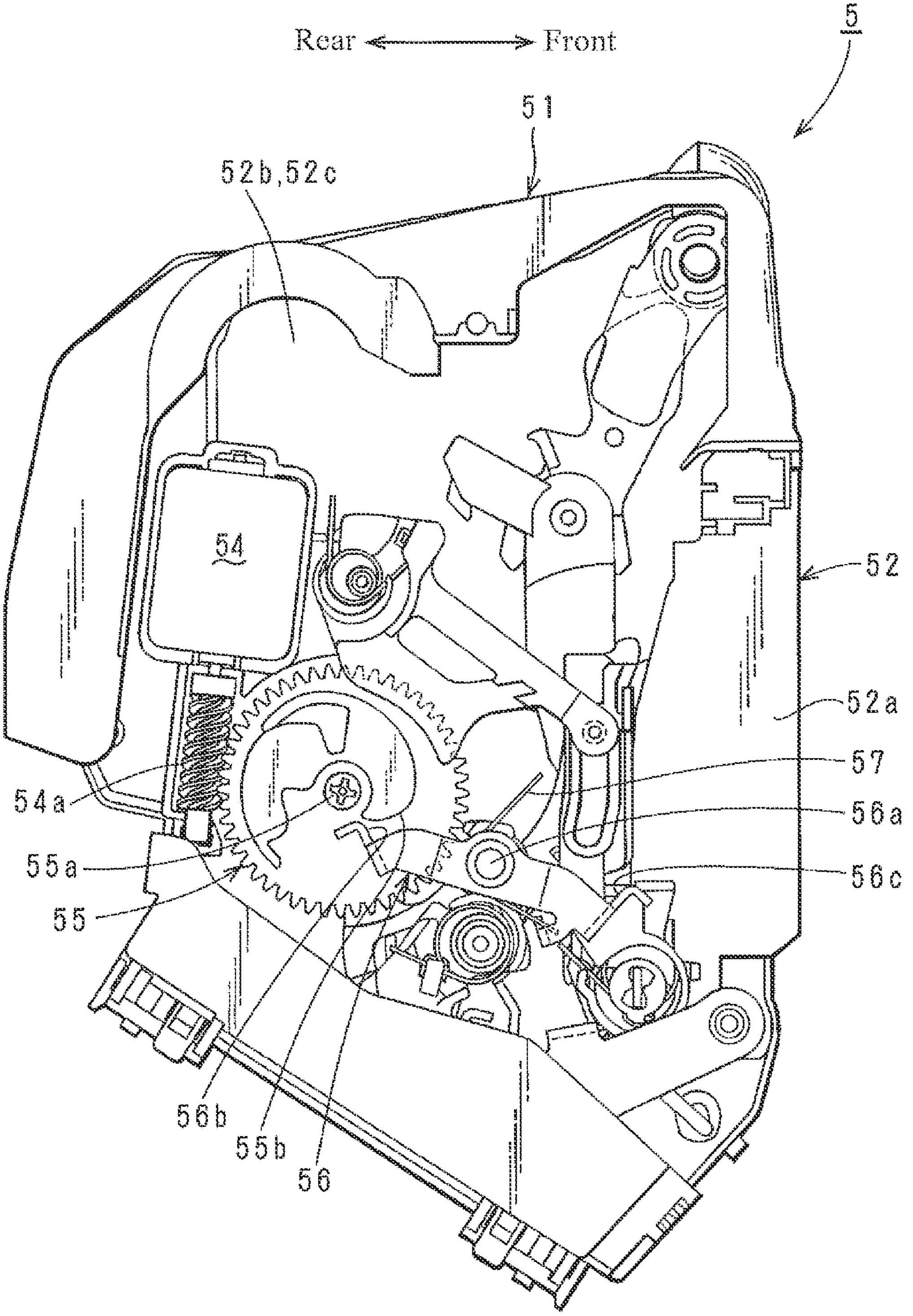
FIG. 16 is a side elevational view showing an inside of the actuator assembly viewed from frontward.

When the input lever 36 pivots in the releasing direction from the standby position as shown in FIG. 14, the first abutting portion 36*a* abuts with the abutted portion 35*b* of the holding lever 35 to make the holding lever 35 pivot in the releasing direction (the clockwise direction in FIGS. 10 to 12) from a blocking position (a position shown in FIGS. 10 to 12 and so on), and the second abutting portion 36*b* abuts with the abutted portion 34*a* of the first ratchet 34A from below to make the first ratchet 34A pivot in the releasing direction from the engagement position. Incidentally, the first ratchet 34A starts to pivot in the releasing direction from the engagement position after the holding lever 35 pivots in the releasing direction from the blocking position.

The stopper lever 37 is pivotably supported by the shaft 45 to pivot independently from the input lever 36. When the input lever 36 pivots in the releasing direction from the standby position, the third abutting portion 36*e* of the input lever 36 abuts with an arm portion 37*b* provided on the stopper lever 37, and the stopper lever 37 pivots in the releasing direction (the counterclockwise direction in FIGS. 8, 13) from the standby position (the position shown in FIGS. 8, 13 and so on) with the input lever 36 against a biasing force of a spring not shown.

The stopper lever 37 is provided with the stopper portion 37*a*. The stopper portion 37*a* extends obliquely upward, enters into a movement locus of the third latch engagement portion 33*d* of the latch 33 in the standby position of the stopper lever 37, and as shown in FIG. 12, abuts with the third latch engagement portion 33*d* to prevent the latch 33 from further pivoting in the opening direction.

Figure 12:
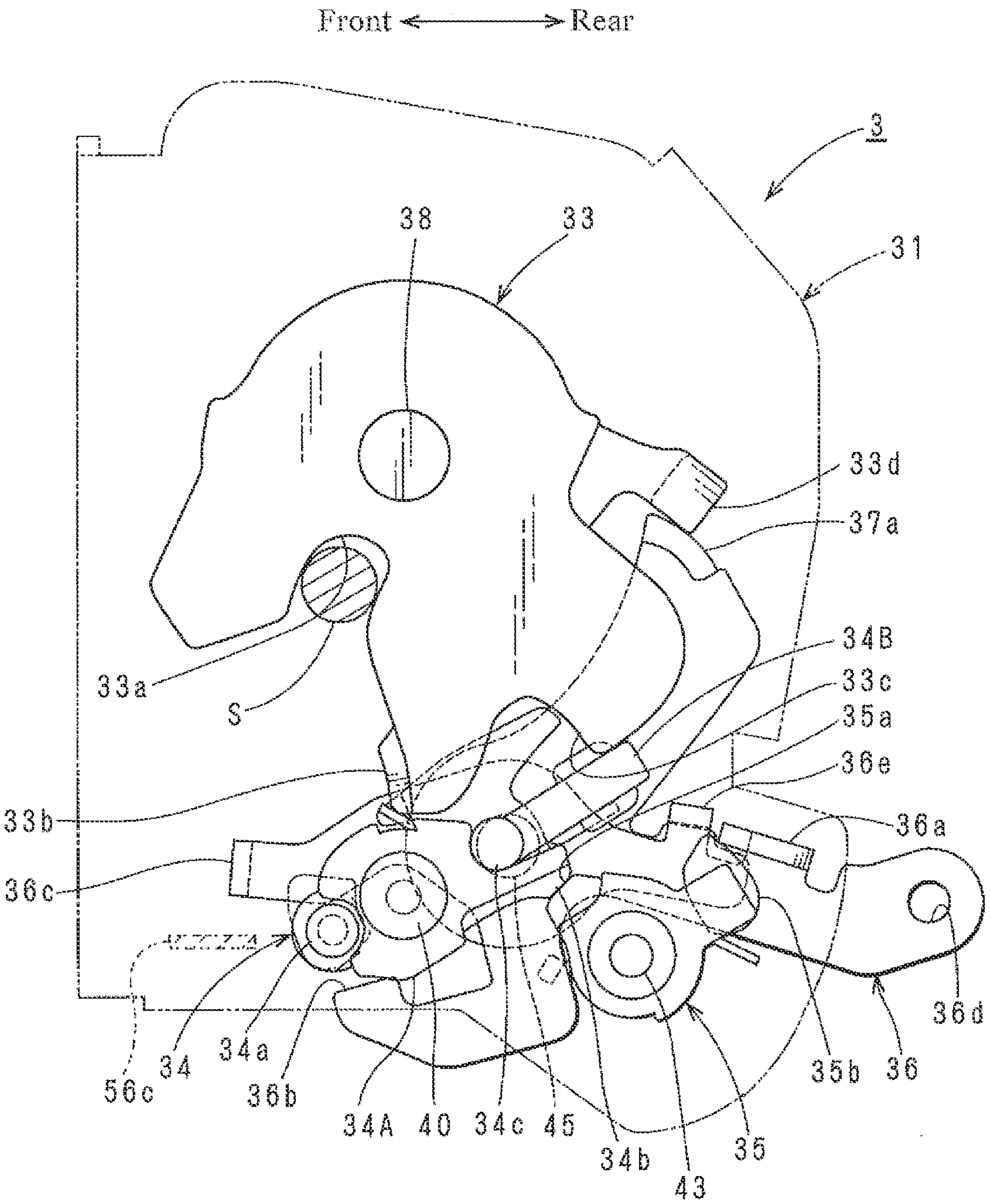
FIG. 12 is a front elevational view showing the principal part in a third latch state.

In the standby position of the stopper lever 37, when the latch 33 pivots in the opening direction from the fully-latched position or the half-latched position, the stopper portion 37*a* abuts with the third latch engagement portion 33*d* of the latch 33 to stop the latch 33 in the third latch position shown in FIG. 12 between the open position and the half-latched position. When the stopper lever 37 is released, the stopper portion 37*a* is made to retreat to an outside of the movement locus of the third latch engagement portion 33*d* of the latch 33 to allow the latch 33 to pivot in the opening direction.

Owing to providing the stopper portion 37*a* on the stopper lever 37 as described above, it is unnecessary to form the stopper portion 37*a* on the input lever 36 having a function to transmit a releasing operation to the ratchet 34. As a consequence, because it is possible to downsize the input lever 36 to reduce its mass, even though a large inertial force is affected to the vehicle door latch device 1 by a vehicle accident and so forth, it is possible to reduce the inertial force on the input lever 36 in releasing direction and to facilitate improving safety.

Next, with referring to FIGS. 1, 2, 15 to 17, the actuator assembly 5 and an assembling method of the engagement assembly 3 to the actuator assembly 5 are explained.

(Actuator Assembly 5)

The actuator assembly 5 has a housing 51 that is made of a synthetic resin and is fixed to the back surface side of the main body 31 to form an outer shell, and the actuator mechanism part (no reference sign) that is arranged in the housing 51 to include the motor 54.

Figure 17:
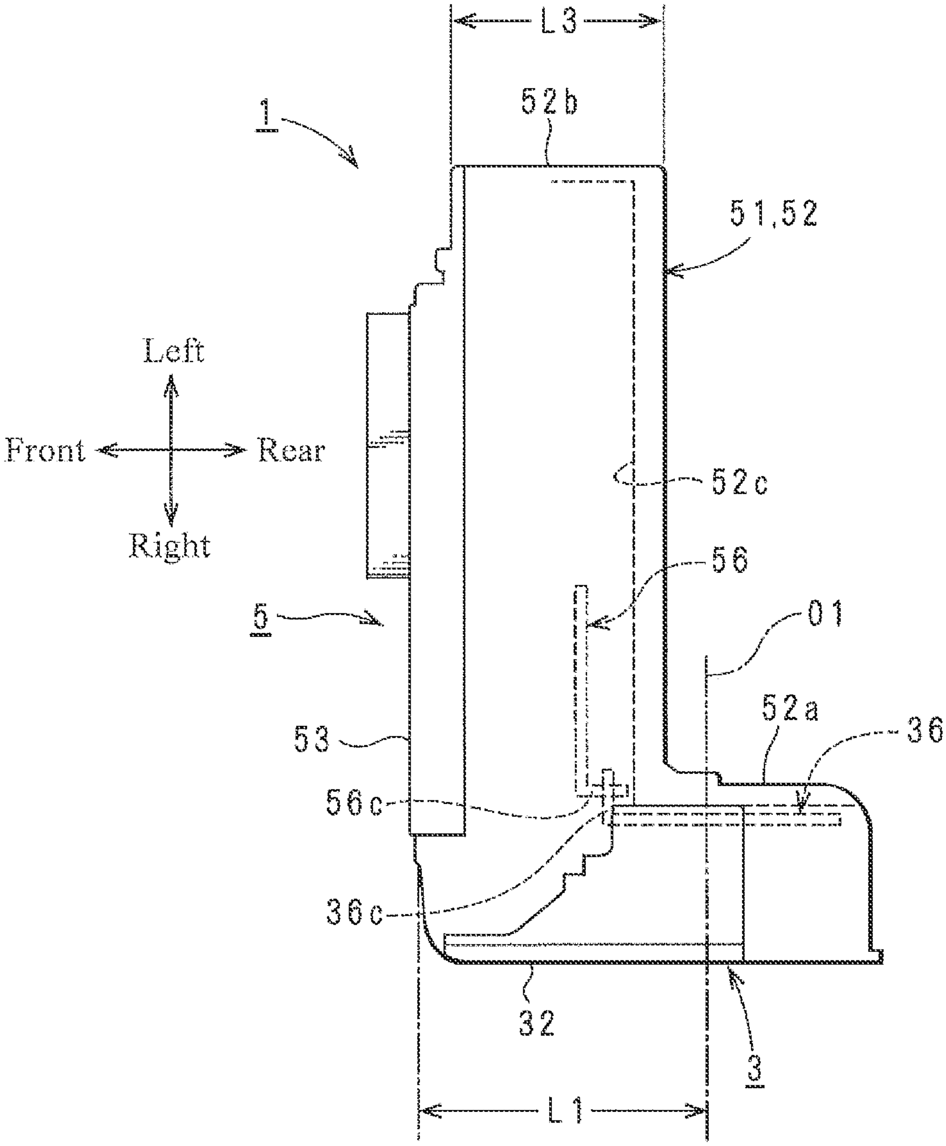
FIG. 17 is a bottom plan view schematically showing the vehicle door latch device of this one embodiment.

As understandable from FIG. 17, the housing 51 includes a housing body 52 made of a synthetic resin to be formed in an L-like shape in a bottom view, and a cover 53 made of a synthetic resin to close a front surface side of the housing body 52. The housing body 52 has a body covering portion 52*a* covering the back surface of the main body 31, and an actuator housing part 52*b* that is substantially perpendicular to the body covering portion 52*a* and the back surface of the main body 31 to be parallel with an inner panel of the door. The front surface of the actuator housing part 52*b* is closed by the cover 53.

An arrangement surface 52*c* that is substantially perpendicular to the body covering portion 52*a* and the back surface of the main body 31 is formed inside of the actuator housing part 52*b*. The actuator mechanism part (no reference sign) is arranged on the arrangement surface 52*c*.

The actuator housing part 52*b* is designed such that a position of the arrangement surface 52*c* corresponds to a position of the first input portion 36*c* of the input lever 36 of the engagement assembly 3. That is, since the position of the input portion 36*c* of the input lever 36 of the engagement assembly 3 using the rear-tooth engagement system is designed in a side rearer than a position of an input portion 360*c* of an input lever 360 of an engagement assembly 300 using a front-tooth engagement system described later, when assuming that thickness in the front-back direction of an actuator housing part 520*b* of a housing 510 fixed to an engagement assembly 300 as L4 (see FIG. 26), as shown in FIG. 17, thickness L3 in the front-back direction of the actuator housing part 52*b* of the housing 51 fixed to the engagement assembly 3 is designed to be larger than thickness L4 such that the arrangement surface 52*c* is positioned in a side rearer than a position of an arrangement surface 520*c* of the actuator housing part 520*b*.

The actuator mechanism part includes the motor 54, a worm wheel 55 engaging with a worm 54*a* fixed to a rotating shaft of the motor 54 and rotating at a reduced speed, and the output lever 56 capable of pivoting at a predetermined angle in a predetermined direction according to the rotation of the worm wheel 55 as main members. Incidentally, although members other than those of the actuator mechanism part are also housed in the actuator housing part 52*b*, such members do not relate to the present invention, and thus the explanation of them is omitted while they are only shown in the drawings.

The motor 54 rotates in a predetermined direction based on an operation of a remote-control switch carried by a user. The worm wheel 55 is supported to the actuator housing part 52*b* by a shaft 55*a* oriented to the front-back direction to be pivotable at a predetermined angle in the releasing direction (the clockwise direction in FIG. 16) from a standby position shown in FIG. 16 according to the rotation of the motor 54. The output lever 56 is supported to be pivotable at the predetermined angle on a face that is between the arrangement surface 52*c* of the actuator housing part 52*b* and the cover 53 and is parallel with the arrangement surface 52*c* by a shaft 56*a* oriented to the front-back direction, and is made to pivot at a predetermined angle in the releasing direction (the counterclockwise direction in FIG. 16) from a standby position shown in FIG. 16 by pivoting of the worm wheel 55. According to this one embodiment, it is configured such that when the worm wheel 55 rotates in the releasing direction, an input portion 56*b* provided on an one end portion of the output lever 56 slidably contacts a cam portion 55*b* formed on the worm wheel 55 and the output lever 56 pivots in the releasing direction around the shaft 56*a* against a biasing force of a spring 57.

The output lever 56 is provided with the output portion 56*c* capable of transmitting its releasing operation to the input lever 36. The output portion 56*c* is formed on a tip portion of an arm extending to cross the first input portion 36*c* of the input lever 36, is bent towards rearward, and is provided at a position deviated downward from the first input portion 36*c* of the input lever 36. When the output lever 56 operates in the releasing direction by the motive power of the motor 54, the output portion 56*c* moves upward and abuts with the first input portion 36*c* from below to make the input lever 36 pivot in the releasing direction from the standby position.

(Assembling Method of Engagement Assembly 3 to Actuator Assembly 5)

As shown in FIG. 2, the engagement assembly 3 is assembled to the actuator assembly 3 by inserting a body (the main body 31 and the cover plate 32) to which the engagement mechanism is previously assembled, into the body covering portion 52*a* of the housing 51 of the actuator assembly 5 from frontward (an arrow direction shown in FIG. 2). Incidentally, the body of the engagement assembly 3 inserted into the body covering portion 52*a* is fixed to the body covering portion 52*a* by a fixing means not shown.

According to this one embodiment, since the configuration in which the output portion 56*c* of the output lever 56 is provided at the position deviated downward from the first input portion 36*c* of the input lever 36 is used, when the engagement assembly 3 is assembled to the actuator assembly 5 as described above, the output portion 56*c* does not interfere with the first input portion 36*c*. As the result, it is possible to easily assemble the engagement assembly 3 to the actuator assembly 5 from frontward.

Next, the operation of the vehicle door latch device 1 is explained according to FIGS. 9 to 14 and 16. When the door is in an open state, as shown in FIG. 9, the latch 33 is in the open position. When the door is closed from this state, the striker S relatively enters into the striker entrance groove 31*a* of the main body 31 and the striker entrance notch 32*a* of the cover plate 32 from frontward to engage with the striker engagement groove 33*a* of the latch 33. Thus, the latch 33 pivots around the latch shaft 38 in the closing direction (the counterclockwise direction in FIG. 9) from the open position. In this case, a tip of the third latch engagement portion 33*d* slidably contacts an upper edge of the stopper lever 37 according to the pivoting of the latch 33 in the closing direction. Moreover, a tip of the half-latched engagement portion 33*c* contacts an upper surface of the second ratchet 34B to make only the second ratchet 34B pivot in the releasing direction against the biasing force of the spring 42 while holding the first ratchet 34A in the engagement position.

Next, as shown in FIG. 10, when the latch 33 reaches the half-latched position, the second ratchet 34B engages with the half-latched engagement portion 33*c* of the latch 33 by the biasing force of the spring 42.

Moreover, when the latch 33 reaches the fully-latched position according to the closing operation of the door as shown in FIG. 11, the second ratchet 34B engages with the fully-latched engagement portion 33*b* by the biasing force of the spring 42, and the door is held in the fully-closed position.

As described above, in the vehicle door latch device 1, since the latch 33 makes only the second ratchet 34B that is a comparatively small member pivot in the releasing direction without making the first ratchet 34A that is a comparatively large member pivot in the releasing direction according to the pivoting of the latch 33 in the closing direction when the latch 33 pivots in the closing direction, it is possible to improve a silence property regarding a door closing sound when closing the door and to obtain an excellent door closing sound. Moreover, in the state that the latch 33 is in the fully-latched position and the second ratchet 34B engages with the fully-latched engagement portion 33*b* of the latch 33, since the holding portion 35*a* of the holding lever 35 abuts with the held portion 34*b* of the first ratchet 34A to prevent the first ratchet 34A from pivoting in the releasing direction, it is possible to ensure the engagement of the second ratchet 34B to the fully-latched engagement portion 33*b*.

Next, a releasing operation of the door is explained.

When the door is held in the fully-closed state, as shown in FIGS. 11, 13, the latch 33 is in the fully-latched position, the ratchet 34 is in the engagement state, the second ratchet 34B engages with the fully-latched engagement portion 33*b* of the latch 33, the holding lever 35 is in the blocking position where the holding portion 35*a* abuts with the held portion 34*b* of the first ratchet 34A, and the stopper lever 37 is in the standby position where the stopper portion 37*a* enters into the movement locus of the third latch engagement portion 33*d* of the latch 33.

In this state, when the remote-control switch is operated to drive the motor 54, the output lever 56 is operated to be released based on the motive power of the motor 54. Thus, the output portion 56*c* of the output lever 56 moves upward to abut with the first input portion 36*c* of the input lever 36 from below. The input lever 36 pivots in the releasing direction from the standby position by the abutment of the output portion 56*c* with the first input portion 36*c*.

When the input lever 36 operates to be released, as shown in FIG. 14, the third abutting portion 36*e* of the input lever 36 abuts with the arm portion 37*b* of the stopper lever 37, and the stopper lever 37 pivots at a predetermined angle in the releasing direction from the standby position. The first abutting portion 36*a* of the input lever 36 abuts with the abutted portion 35*b* of the holding lever 35, and the holding lever 35 pivots at a predetermined angle in the releasing direction from the blocking position. Next, after the holding portion 35*a* completely disengage from the held portion 34*b* of the first ratchet 34A according to the releasing operation of the holding lever 35, the second abutting portion 36*b* of the input lever 36 abuts with the abutted portion 34*a* of the first ratchet 34A from below. Thus, the first ratchet 34A pivots in the releasing direction from the engagement position, and the second ratchet 34B disengages from the fully-latched engagement portion 33*b* of the latch 33 to allow the latch 33 to pivot in the opening direction from the fully-latched position.

Generally, when the second ratchet 34B disengages from the fully-latched engagement portion 33*b* of the latch 33, the door is pushed out by a counterforce of a weather strip provided on a peripheral portion of a door opening part, the latch 33 pivots to the open position, and the striker S exits from the striker engagement groove 33*a* of the latch 33, thereby enabling the door to open.

When the latch 33 pivots to the open position to open the door, the motor 54 stops driving, the output lever 56 returns to the standby position, and then, the input lever 36, the stopper lever 37, the holding lever 35, and the first and second ratchets 34A, 34B respectively pivot to return each position shown in FIG. 9.

However, even though the second ratchet 34B disengages from the fully-latched engagement portion 33*b* of the latch

33 by the motive power of the motor 54, there are cases that the counterforce of the weatherstrip is lowered by influence such as an aged deterioration, that the door is not completely pushed out by the counterforce of the weatherstrip under an environment of winter so that the latch 33 is sometimes stopped at a position before the open position, and that movements of the respective members are sometimes lost owing to freezing of movable parts and so on.

Particularly among the members, in the case where each movement of the first and second ratchets 34A, 34B is lost, when the first and second ratchets 34A, 34B respectively pivot in the engaging direction from their released states by the respective biasing forces of the springs 41, 42, a so-called unsteady engagement state sometimes occurs, wherein the unsteady engagement state is that the second ratchet 34B does not steadily engage with the fully-latched engagement portion 33*b* of the latch 33 stopped in the fully-latched position (or a position where the fully-latched engagement portion 33*b* of the latch 33 is slightly moved from there in the opening direction) so as to reach a regular engagement position.

When the unsteady engagement state occurs, the first ratchet 34A cannot pivot to the regular engagement position, and the holding portion 35*a* of the holding lever 35 cannot abut with the held portion 34*b* of the first ratchet 34A. Thus, pivoting of the first ratchet 34A in the releasing direction is not prevented by the holding lever 35 and is free.

Therefore, in the case of the unsteady engagement state, when a large force affects the latch 33 so as to pivot in the opening direction from the fully-latched position by a traffic accident and so forth, the first ratchet 34A is made to pivot in the releasing direction together with the second ratchet 34B that is unsteadily engaged with the fully-latched engagement portion 33*b*, thereby releasing the second ratchet 34B from the fully-latched engagement portion 33*b*. In the worst case, the second ratchet 34B cannot engage with also the half-latched engagement portion 33*c*, and the latch 33 sometimes pivots to the open position.

However, in the case of the vehicle door latch device 1 of this one embodiment, in the unsteady engagement state, when the latch 33 pivots in the opening direction to slightly pass the half-latched position and reach the third latch position, the third latch engagement portion 33*d* of the latch 33 abuts with the stopper portion 37*a* of the stopper lever 37 as shown in FIG. 12. Thus, a further pivoting of the latch 33 in the opening direction is prevented, and the latch 33 stops in the third latch position to keep the engagement with the striker S.

(Vehicle Door Latch Device 100 Using Front-Tooth Engagement System)

Next, according to FIGS. 18 to 26, a vehicle door latch device 100 using a front-tooth engagement system is explained. Incidentally, in the following explanation, the vehicle door latch device 100 using the front-tooth engagement system is referred to as "another embodiment" as necessary.

Figure 18:
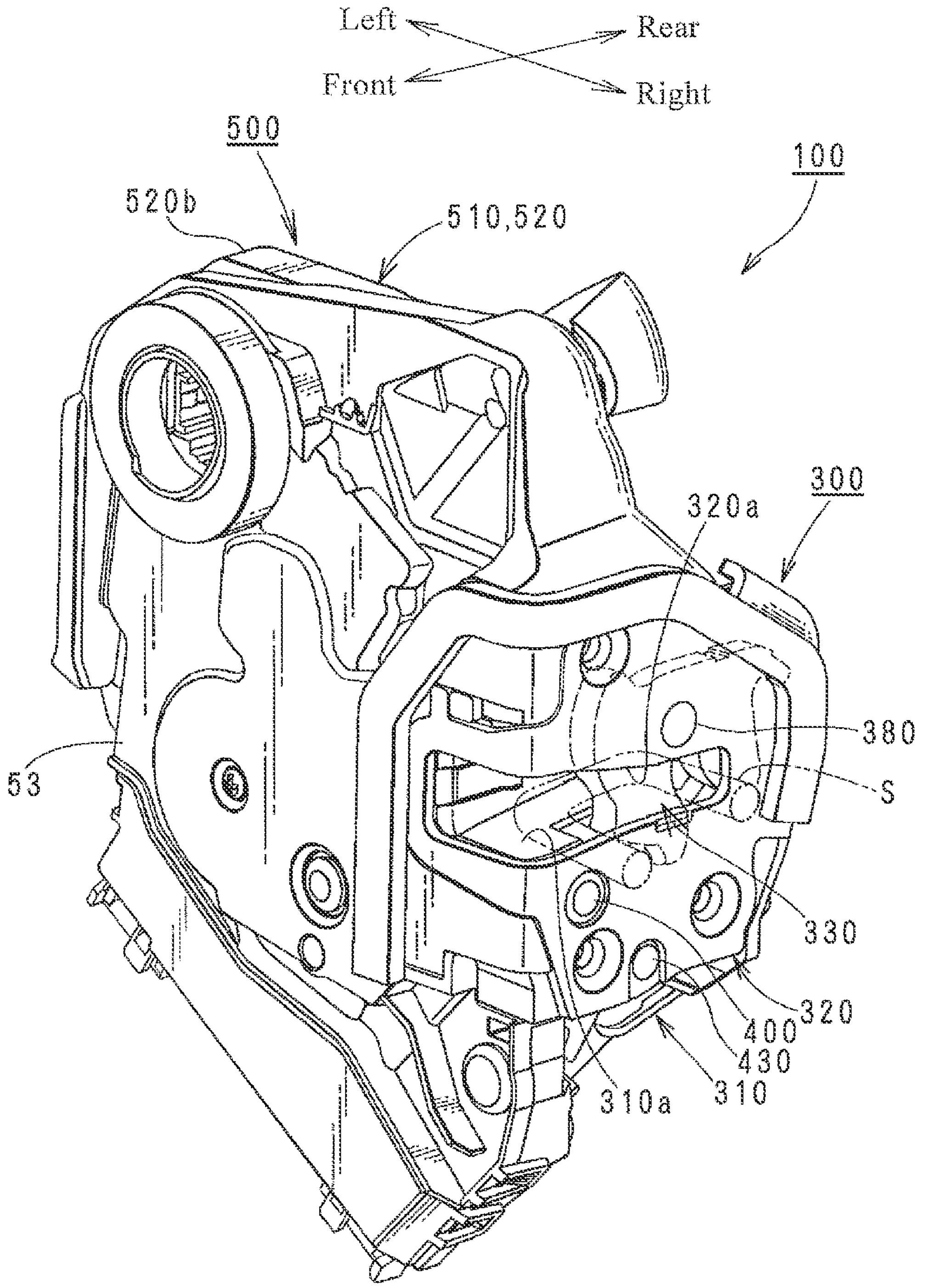
FIG. 18 is a perspective view showing a vehicle door latch device of another embodiment of the present invention.
Figure 19:
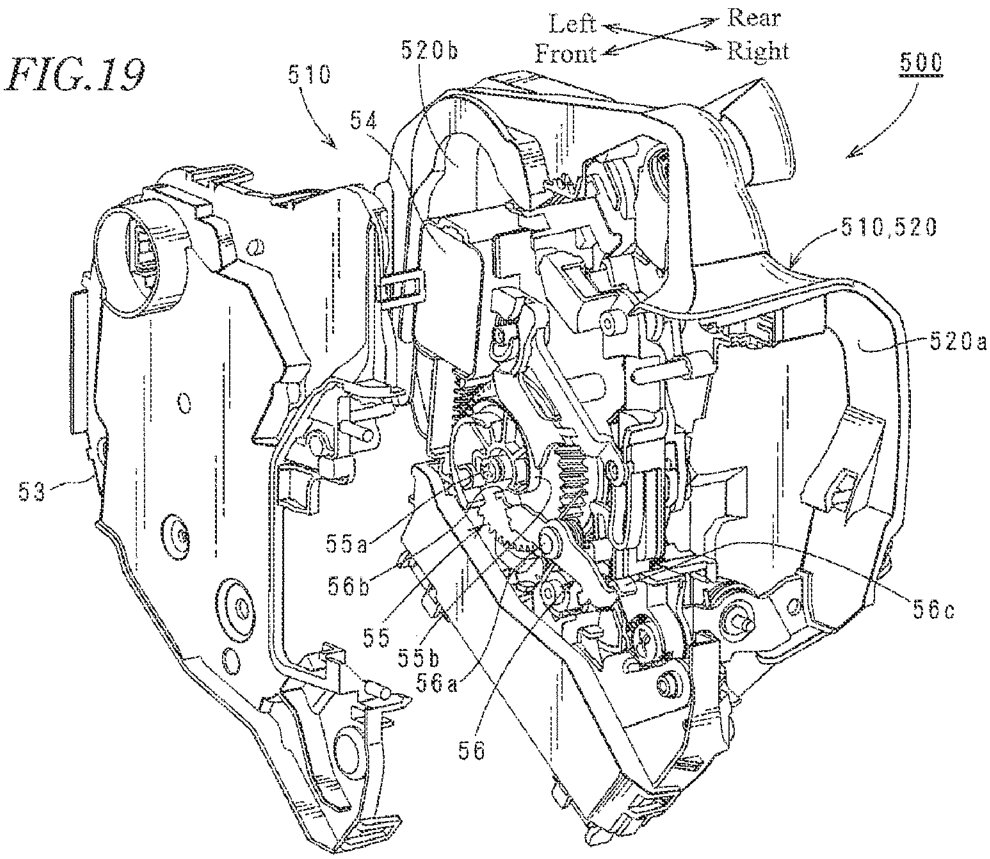
FIG. 19 is an exploded perspective view showing an actuator assembly of the above-described another embodiment.
Figure 20:
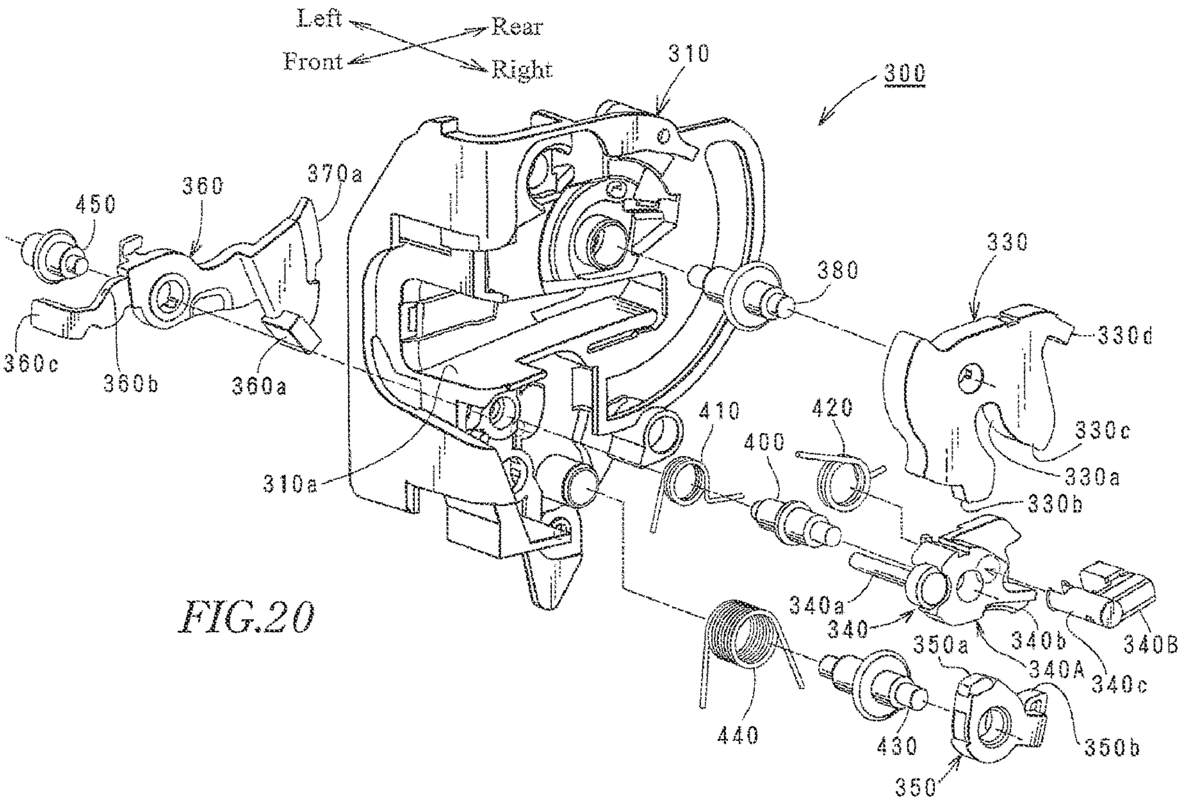
FIG. 20 is an exploded perspective view showing an engagement assembly of the above-described another embodiment.

As shown in FIGS. 18, 19, the vehicle door latch device 100 includes an engagement assembly 300 and an actuator assembly 500 assembled to the engagement assembly 300 in the same manner as said one embodiment.

Incidentally, regarding the engagement assembly 300 of this another embodiment, each member having the same function as that of the engagement assembly 3 of said one embodiment is indicated in the drawings with a reference sign with the numeral "0" attached to the end of the number of the corresponding reference sign used in said one embodiment, and their detailed explanations are appropriately omitted. Moreover, the actuator assembly 500 of this another embodiment is the same as that in said one embodiment except for a housing body 520, and it is indicated with reference signs that are the same as in said one embodiment, and its detailed explanation is appropriately omitted.

The engagement assembly 300 has a body including a main body 310 and a cover plate 320; a latch 330, a ratchet 340, and a holding lever 350; and the input lever 360 that is arranged on a back surface of the main body 310. Incidentally, while said one embodiment has the formation that the stopper portion 37*a* is provided on the stopper lever 37, this another embodiment has the formation that the stopper portion 370*a* (corresponding to the stopper portion 37*a* of said one embodiment) is provided on the input lever 360 with omitting the stopper lever 36. However, the stopper lever can be provided in this another embodiment in the same manner as said one embodiment.

Figure 21:
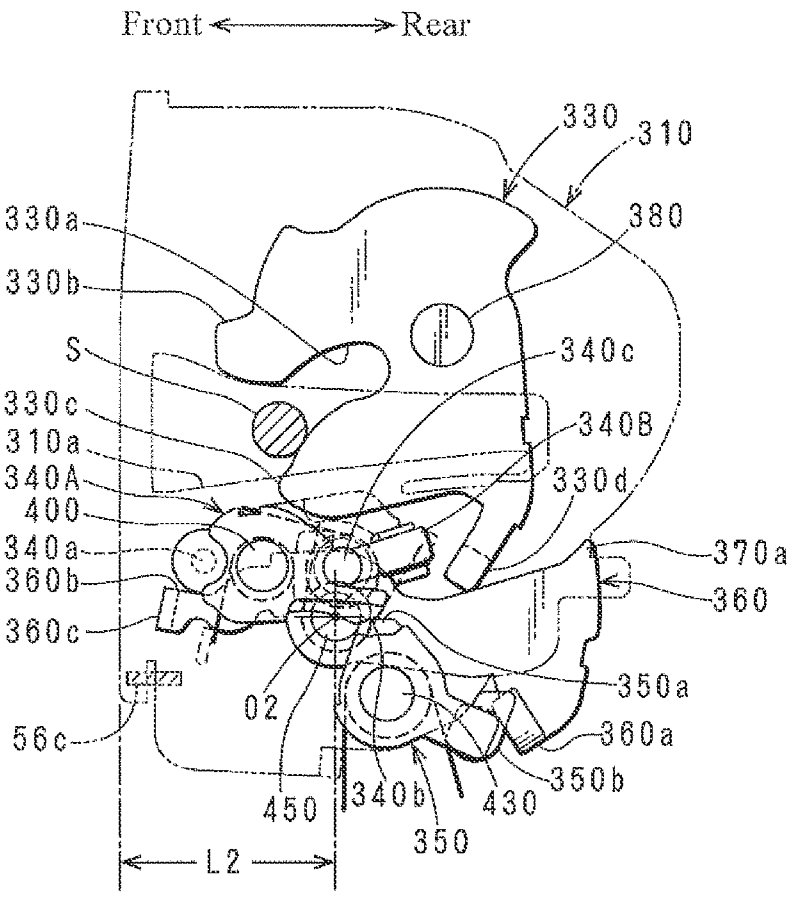
FIG. 21 is a front elevational view showing a principal part in an open state of the above-described another embodiment.
Figure 22:
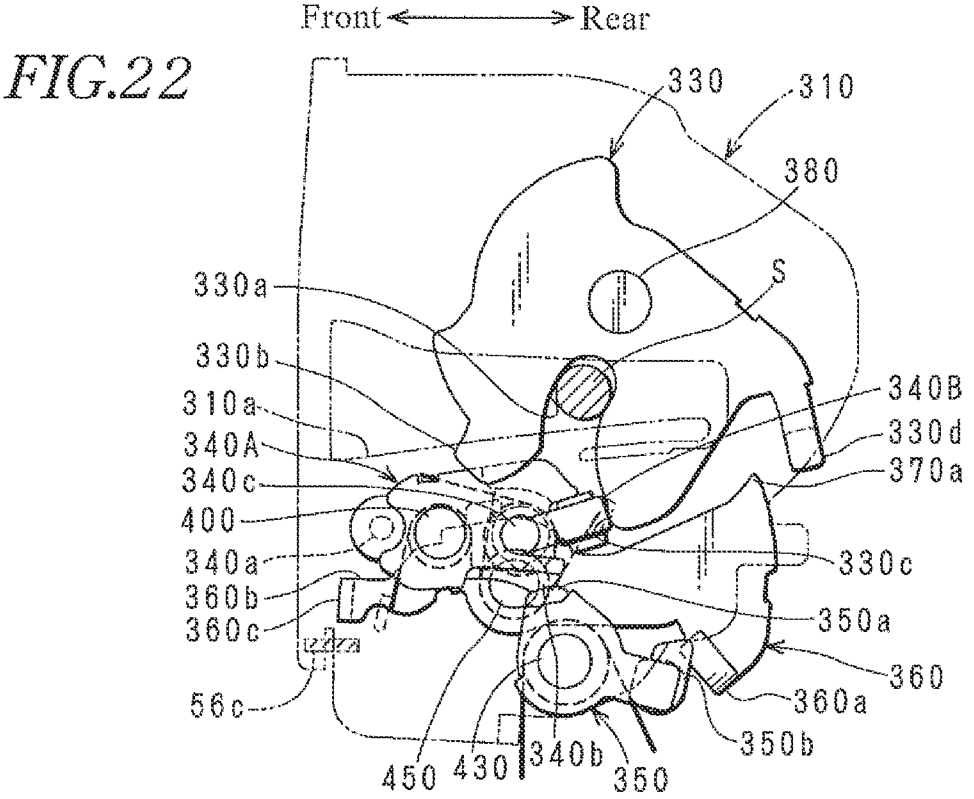
FIG. 22 is a front elevational view showing the principal part in a half-latched state of the above-described another embodiment.
Figure 23:
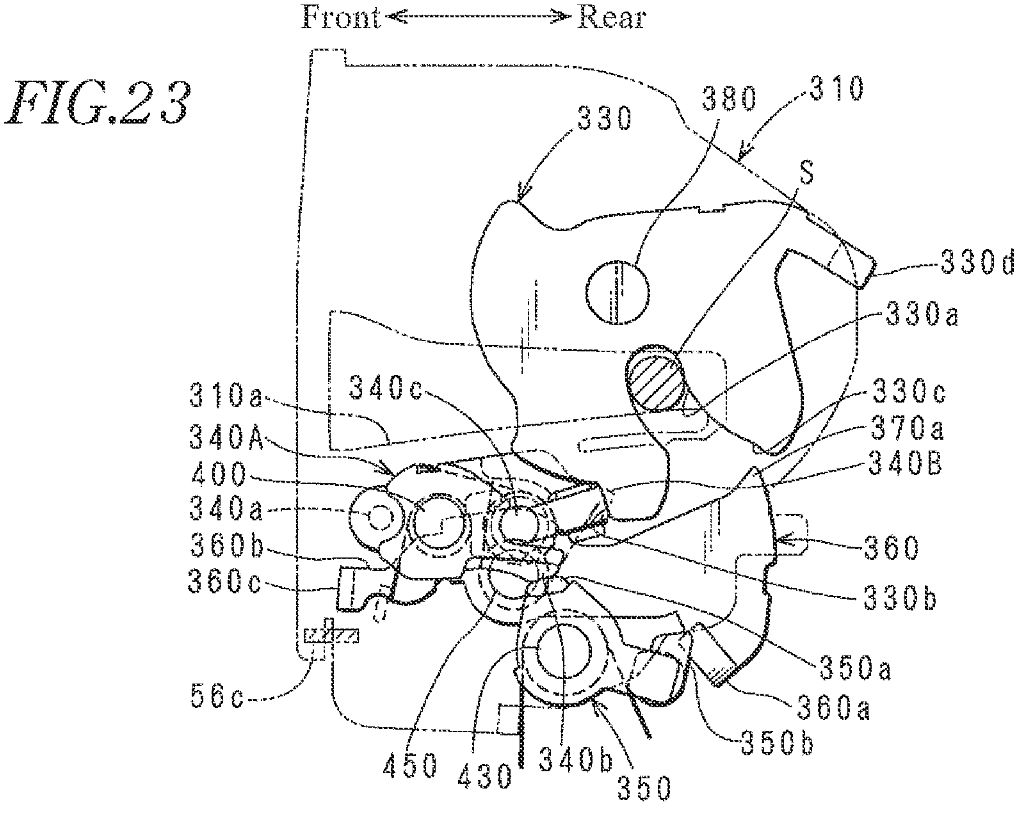
FIG. 23 is a front elevational view showing the principal part in a fully-latched state of the above-described another embodiment.
Figure 24:
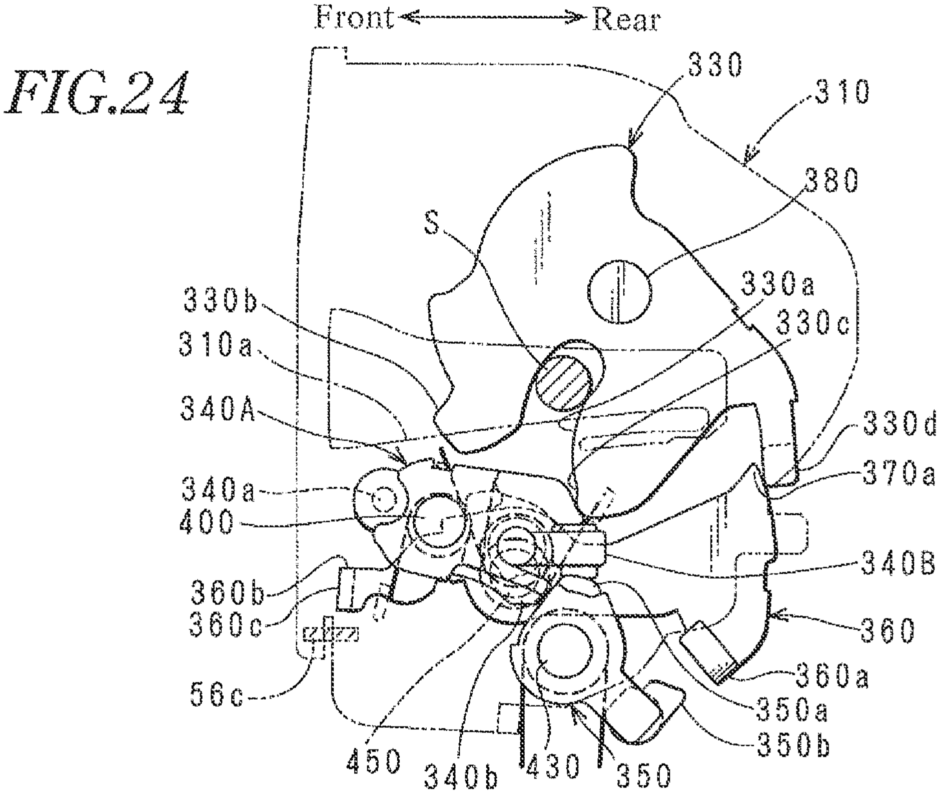
FIG. 24 is a front elevational view showing the principal part in a third latch state of the above-described another embodiment.

The latch 330 is provided with a striker engagement groove 330*a* with which the striker S is capable of engaging, a fully-latched engagement portion 330*b* that is provided on an opening direction side (the clockwise direction side in FIG. 21) of the striker engagement groove 330*a* and is capable of engaging with a second ratchet 340B of the ratchet 340 when the latch 330 is in the fully-latched position shown in FIG. 23, a half-latched engagement portion 330*c* that is provided on the closing direction side (the counterclockwise direction side in FIG. 21) of the striker engagement groove 330*a* and is capable of engaging with the second ratchet 340B when the latch 330 is in the half-latched position shown in FIG. 22, and a third latch engagement portion 330*d* that is provided further in the closing direction side than the half-latched engagement portion 330*c* and is capable of engaging with a stopper portion 370*a* provided on the input lever 360 when the latch 330 is in a third latch position shown FIG. 24.

The ratchet 340 includes a first ratchet 340A supported pivotably at a predetermined angle by a ratchet shaft 400 oriented in the left-right direction between the main body 310 and the cover plate 320, and the second ratchet 340B supported pivotably at a predetermined angle to the first ratchet 340A.

The first ratchet 340A is capable of pivoting around the ratchet shaft 400 in a releasing direction (the clockwise direction in FIGS. 22, 23) from an engagement position shown in FIGS. 22, 23. Incidentally, since the engagement assembly 300 uses the front-tooth engagement system, the ratchet shaft 400 supporting the first ratchet 340A to be pivotable is arranged in a front side of the ratchet shaft 40 of said one embodiment using the rear-tooth engagement system, and in a vicinity of a lower portion of an entrance side (a front side) of the striker entrance groove 310*a* and the striker entrance notch 320*a*.

The second ratchet 340B is biased in an engaging direction in which its tip portion engages with the fully-latched engagement portion 330*b* or the half-latched engagement portion 330*c* of the latch 330, by a biasing force of a spring 420.

Figure 25:
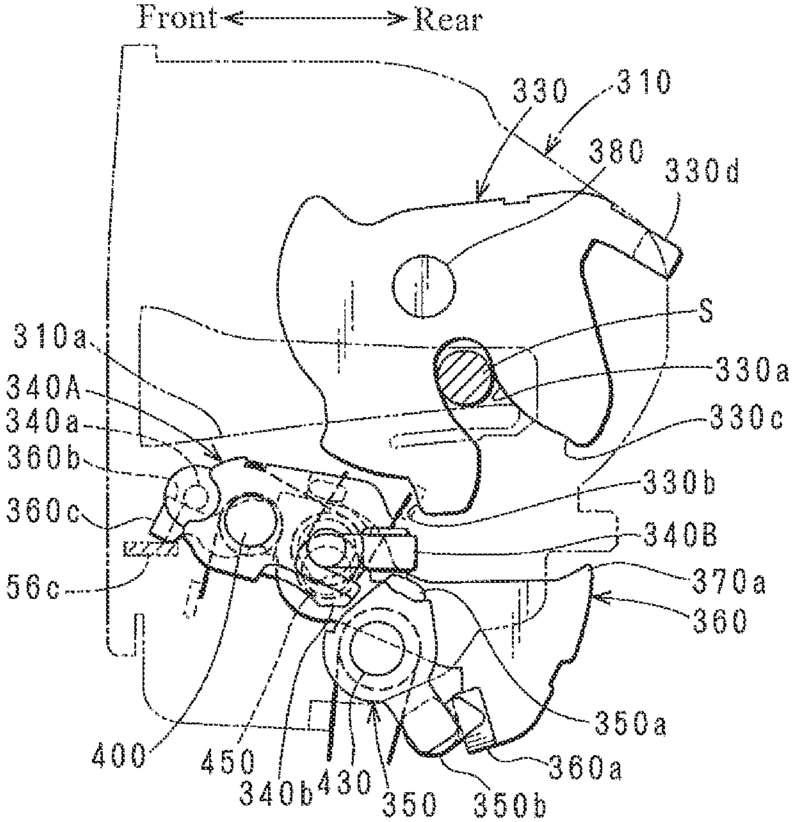
FIG. 25 is a front elevational view showing the principal part in a releasing operation state of the above-described another embodiment.

Accordingly, as shown in FIG. 23, the ratchet 340 holds the latch 330 in the fully-latched position by engaging the second ratchet 340B with the fully-latched engagement portion 330*b* of the latch 330, and as shown in FIG. 22, the ratchet 340 holds the latch 330 in the half-latched position by engaging the second ratchet 340B with the half-latched engagement portion 330*c* of the latch 330. Moreover, as shown in FIG. 25, when the first ratchet 340A pivots at a predetermined angle in the releasing direction from a standby position, the second ratchet 340B disengages from the fully-latched engagement portion 330*b* or the half-latched engagement portion 330*c* of the latch 330 to allow the latch 330 to pivot in the opening direction and to open the door.

The holding lever 350 is arranged in a rear and lower side of the first ratchet 340A to be pivotable at a predetermined angle by a shaft 430.

The input lever 360 is supported to the back surface of the main body 310 by a shaft 450 oriented in the left-right direction to be pivotable at a predetermined angle, and is capable of pivoting at the predetermined angle in the releasing direction (the clockwise direction in FIG. 23) from a standby position shown in FIG. 23 and so on.

Figure 26:
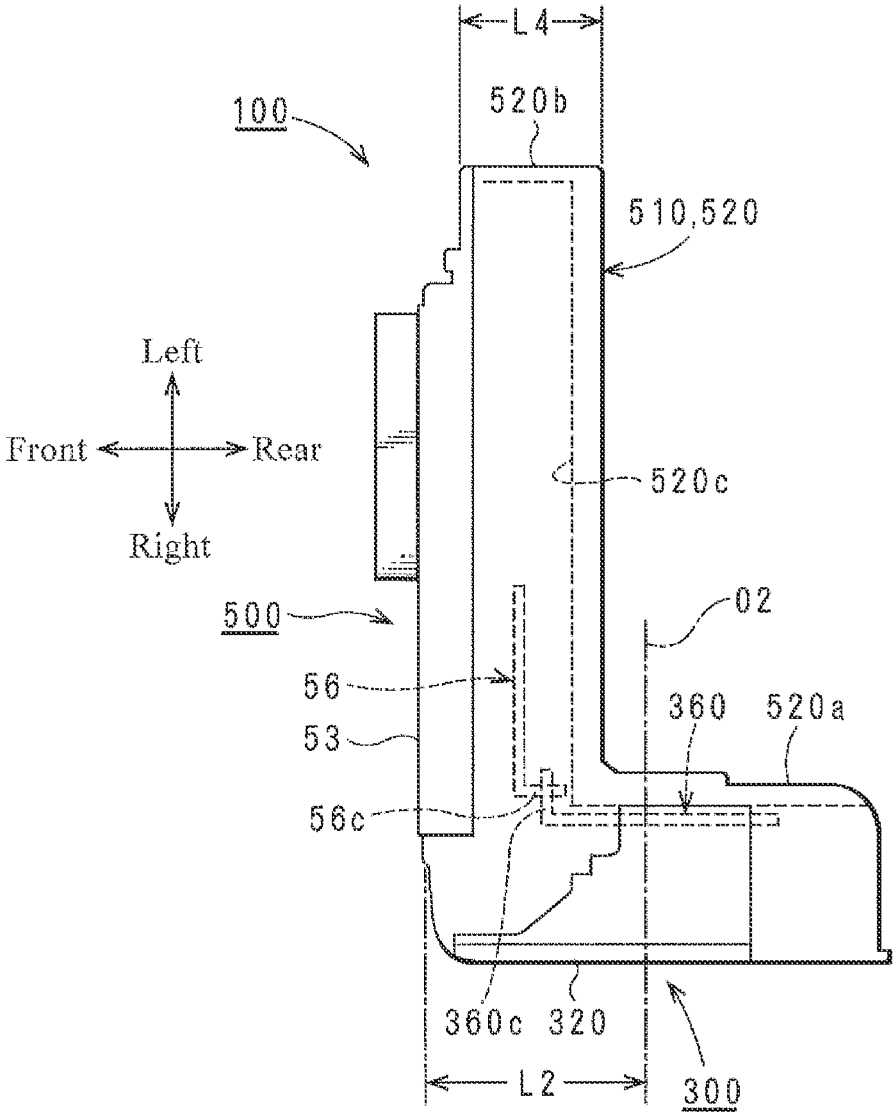
FIG. 26 is a bottom plan view schematically showing the vehicle door latch device of the above-described another embodiment.

The shaft 450 supporting the input lever 360 is arranged in a front side of the shaft 45 supporting the input lever 36 of said one embodiment because the ratchet shaft 400 supporting the first ratchet 340A is arranged in the front side of the ratchet shaft 40 of said one embodiment. That is, a length L2 between a front edge of the main body 310 and a center O2 of the shaft 450 of this another embodiment shown in FIGS. 21, 26 is shorter than a length L1 between a front edge of the main body 31 and a center O1 of the shaft 45 of said one embodiment shown in FIGS. 9, 17. Moreover, accordingly, the input portion 360*c* of the input lever 360 of this another embodiment is arranged in a front side of the first input portion 36*c* of the input lever 36 of said one embodiment.

The input lever 360 is provided with a first abutting portion 360*a* that abuts with an abutted portion 350*b* of the holding lever 350 from above to make the holding lever 350 pivot in the releasing direction when the input lever 360 pivots in the releasing direction from the standby position, a second abutting portion 360*b* that abuts with an abutted portion 340*a* of the first ratchet 340A from below to operate the first ratchet 340A in the releasing direction, and a input portion 360*c* into which a motive power of a motor 54 of the actuator assembly 500 can be inputted. Thus, the input lever 360 pivots in the releasing direction from the standby position based on the motive power of the motor 54.

The input portion 360*c* is formed on a front-end portion of the input lever 360 so as to be bent toward the left direction (the direction toward the housing 510), and is provided at a position deviated upward from an output portion 56*c* of an output lever 56 of the actuator assembly 500 such that the output portion 56*c* is possible to abut with the first input portion 360*c* from below when the output lever 56 is released. Thus, when the output lever 56 is released by the motive power of the motor 54 to make the output portion 560*c* abut with the input portion 360*c* from below, the input lever 360 is made to pivot in the releasing direction from the standby position.

When the input lever 360 pivots in the releasing direction from the standby position, the first abutting portion 360*a* abuts with the abutted portion 350*b* of the holding lever 350 to make the holding lever 350 pivot in the releasing direction from a blocking position, and the second abutting portion 360*b* abuts with the abutted portion 340*a* of the first ratchet 340A from below to make the first ratchet 340A pivot in the releasing direction from the engagement position.

In the same manner as said one embodiment, the housing 510 of the actuator assembly 500 includes a housing body 520 made of a synthetic resin to be formed in an L-like shape in a bottom view, and a cover 53 made of a synthetic resin to close a front surface side of the housing body 520. In the same manner as said one embodiment, the housing body 520 is formed with a body covering portion 520*a* and an actuator housing part 520*b*.

An actuator mechanism part is housed in the actuator housing part 520*b*. The actuator mechanism part includes the motor 54, a worm wheel 55, and the output lever 56 so as to have the same configuration as that of said one embodiment. That is, the actuator mechanism part is communized between said one embodiment and this another embodiment.

In the same manner as said one embodiment, the output portion 56*c* of the output lever 56 of this another embodiment is provided at a position deviated downward from the input portion 360*c* of the input lever 360. Thus, in this another embodiment, when the output lever 56 operates in the releasing direction by the motive power of the motor 54, the output portion 56*c* moves upward to abut with the input portion 360*c*. Thus, the input lever 360 pivots in the releasing direction from the standby position based on the releasing operation of the output lever 56.

As described above, since the input portion 360*c* of the input lever 360 of this another embodiment is designed in a side fronter than a position of the first input portion 36*c* of said one embodiment, the arrangement surface 520*c* of the actuator housing part 520*b* of the housing body 520 is designed in a side fronter than a position of the arrangement surface 52*c* of the actuator housing part 52*b* of the housing body 52 of said one embodiment. That is, the thickness L4 in the front-back direction of the actuator housing part 520*b* of this another embodiment shown in FIG. 26 is designed to be smaller than the thickness L3 in the front-back direction of the actuator housing part 52*b* of said one embodiment shown in FIG. 17. By designing in this manner, it is possible to make the entire actuator mechanism part in the same configuration as that of said one embodiment, and to arrange the output portion 56*c* of the output lever 56 in a position to cross the input portion 360*c* of the input lever 360. As the result, it is possible to communize the entire actuator mechanism part between the engagement assemblies using different engagement systems each other by changing the housing body 52, 520 only of the housing 51, 510.

Basic operations of the vehicle door latch device 100 of this another embodiment are the same as those of said one embodiment, and thus the explanation of them is omitted while they are only shown in the drawings. Incidentally, FIGS. 21 to 25 show the respective operations of this another embodiment, FIG. 21 shows an open state (the state where the latch 330 is in the open position), FIG. 22 shows a half-latched state (the state where the ratchet 340 engages with the half-latched engagement portion 330*c* of the latch 330), FIG. 23 shows a fully-latched state (the state where the ratchet 340 engages with the fully-latched engagement portion 330*b* of the latch 330), FIG. 24 shows a third latch state (the state where the stopper portion 370*a* of the input lever 360 engages with the third latch engagement portion 330*d* of the latch 330), and FIG. 25 shows a releasing operation state (the state where the ratchet 340 operates by the releasing operation of the output lever 56).

As described above, the input lever 36, 360 is pivotably supported to the back surface of the main body 31, 310 of the engagement assembly 3, 300 by the shaft 45, 450 oriented to the left-right direction; the actuator mechanism part is provided in the actuator housing part 52*b*, 520*b* that is included in the housing body 52, 520 of the actuator assembly 5, 500 and is substantially perpendicular to the back surface of the main body 31, 310; the output lever 56 is pivotably supported on the arrangement surface 52*c*, 520*c* of the actuator housing part 52*b*, 520*b* by the shaft 56*a* oriented to the front-back direction; and the output portion 56*c* of the output lever 56 is arranged at the position deviated downward from each of the first input portion 36*c* and the input portion 360*c* of the input lever 36, 360. Therefore, even though there are differences in the pivoting position of the input lever and the position of the input portion owing to the various engagement systems, it is possible to transmit the releasing operation of the output lever 56 to the input lever 36, 360 by designing the arrangement surface 52*c*, 520*c* of the actuator housing part 52*b*, 520*b* of the housing body 52, 520 to adjust the arrangement surface 52*c*, 520*c* to each position of the input portion of the various engagement systems. Thus, by changing the housing only of the engagement assemblies that use different various engagement systems respectively, it is possible to communize the actuator mechanism part, and to correspond to each fixing position of automobile manufacturers without increasing cost.

What is claimed is:

1. A vehicle door latch device comprising an engagement assembly and an actuator assembly, wherein the engagement assembly comprises a body, a latch that is supported to the body to pivot by a latch shaft oriented in a left-right direction and is formed with a striker engagement groove engaging with a striker entering from a front direction, a ratchet that is supported to the body to pivot by a ratchet shaft oriented in the left-right direction and to engage with a front-tooth-side fully-latched engagement portion provided on an opening direction side of the striker engagement groove of the latch or a rear-tooth-side fully-latched engagement portion provided on a closing direction side of the striker engagement groove of the latch, and an input lever that is supported to the body to pivot and to transmit the input lever's releasing operation to the ratchet, wherein the actuator assembly comprises a housing fixed to the body, and an actuator mechanism part arranged in the housing to include a motor and an output lever transmitting a motive power of the motor to the input lever, wherein the housing comprises a body covering portion that covers the body and is selectively fixed to the engagement assembly of a front-tooth engagement system in which the ratchet engages with the front-tooth-side fully-latched engagement portion of the latch or the engagement assembly of a rear-tooth engagement system in which the ratchet engages with the rear-tooth-side fully-latched engagement portion of the latch, and an actuator housing part substantially perpendicular to a back surface of the body to have an arrangement surface which faces the front direction and on which the actuator mechanism part is arranged, wherein the output lever is supported on the arrangement surface of the actuator housing part to pivot by a first shaft oriented in a front-back direction and is formed with an output portion that moves vertically based on the output lever's releasing operation, wherein the input lever is supported to the back surface of the body to pivot by a second shaft oriented in the left-right direction, is formed with an input portion at an end portion extending to cross the output portion of the output lever, and is released by abutting the output portion with the input portion based on the releasing operation of the output lever, and wherein the arrangement surface of the actuator housing part of the actuator assembly in the front-tooth engagement system is arranged to correspond to the position of the input lever of the engagement assembly in the front-tooth engagement system.

2. The vehicle door latch device according to claim 1, wherein the output portion of the output lever is provided at a position deviated downward from the input portion of the input lever.

3. The vehicle door latch device according to claim 1, wherein the output portion of the output lever is formed to be bent rearward and the input portion of the input lever is formed to be bent toward the output portion so as to cross the output portion.

4. The vehicle door latch device according to claim 1, wherein a stopper lever is provided to be supported on the back surface of the body by the second shaft to pivot independently from the input lever, and the stopper lever has a stopper portion that moves from a standby position where a third latch engagement portion provided on the latch abuts with the stopper portion to a retreating position where the third latch engagement portion does not abut with the stopper portion when the stopper lever is released based on the releasing operation of the input lever.

5. The vehicle door latch device according to claim 1, wherein the ratchet comprises a first ratchet supported to the body to pivot around the ratchet shaft oriented in the left-right direction and a second ratchet supported to the first ratchet to pivot around a shaft oriented in the left-right direction and to engage with the fully-latched engagement portion of the latch.

6. The vehicle door latch device according to claim 2, wherein the output portion of the output lever is formed to be bent rearward and the input portion of the input lever is formed to be bent toward the output portion so as to cross the output portion.

7. The vehicle door latch device according to claim 2, wherein a stopper lever is provided to be supported on the back surface of the body by the second shaft to pivot independently from the input lever, and the stopper lever has a stopper portion that moves from a standby position where a third latch engagement portion provided on the latch abuts with the stopper portion to a retreating position where the third latch engagement portion does not abut with the stopper portion when the stopper lever is released based on the releasing operation of the input lever.

8. The vehicle door latch device according to claim 2, wherein the ratchet comprises a first ratchet supported to the body to pivot around the ratchet shaft oriented in the left-right direction and a second ratchet supported to the first ratchet to pivot around a shaft oriented in the left-right direction and to engage with the fully-latched engagement portion of the latch.

* * * * *